United States Patent
Hamadani et al.

(10) Patent No.: US 9,941,837 B2
(45) Date of Patent: Apr. 10, 2018

(54) COMBINATORIAL FLUX ADDER FOR DETERMINING PHOTOVOLTAIC CELL NONLINEARITY

(71) Applicant: THE UNITED STATES OF AMERICA, AS REPRESENTED BY THE SECRETARY OF COMMERCE, Washington, DC (US)

(72) Inventors: Behrang H. Hamadani, Clarksburg, MD (US); Andrew M. Shore, Arlington, VA (US); Howard W. Yoon, North Potomac, MD (US)

(73) Assignee: THE UNITED STATES OF AMERICA, AS REPRESENTED BY THE SECRETARY OF COMMERCE, Washington, DC (US)

( * ) Notice: Subject to any disclaimer, the term of this patent is extended or adjusted under 35 U.S.C. 154(b) by 30 days.

(21) Appl. No.: 15/279,718

(22) Filed: Sep. 29, 2016

(65) Prior Publication Data
US 2017/0099032 A1    Apr. 6, 2017

Related U.S. Application Data

(60) Provisional application No. 62/236,521, filed on Oct. 2, 2015.

(51) Int. Cl.
*H02S 50/10* (2014.01)
(52) U.S. Cl.
CPC .................................. *H02S 50/10* (2014.12)
(58) Field of Classification Search
CPC combination set(s) only.
See application file for complete search history.

(56) References Cited

U.S. PATENT DOCUMENTS

2012/0217747 A1* 8/2012 Cao .................. H02J 3/386
290/44

OTHER PUBLICATIONS

Shin, D-J., et al., "A novel linearity tester for optical detectors using high-brightness light emitting diodes", Meterologia, Mar. 31, 2005, 154-158, 42.
Emery, K., et al., "Linearity testing of photovoltaic cells", IEEE, 2006, 2177-2180.

(Continued)

*Primary Examiner* — Vincent Q Nguyen
(74) *Attorney, Agent, or Firm* — Toby D. Hain

(57) ABSTRACT

A process for determining a nonlinear response of a photovoltaic cell that includes: producing a first set of first light pulses including a first light that includes a first photon flux; and different first magnitudes of first photon flux; producing a second set of second light pulses that include: a second light including a second photon flux; and different second magnitudes of second photon flux; repeating the first light pulses in a selected combination with the second light pulses to produce a combinatorial set of combinatorial light pulses including: a combinatorial light comprising a combinatorial photon flux and different combinatorial magnitudes; irradiating a photovoltaic cell separately with the first set, second set, and the combinatorial set; separately producing, a first, second, and combinatorial photovoltaic output; and solving a system of linear equations to determine the nonlinear relationship between the photovoltaic output and the magnitude of flux.

20 Claims, 22 Drawing Sheets

(56) References Cited

OTHER PUBLICATIONS

White, D.R., et al., "A general technique for calibrating indicating instruments", Meterlogia, Mar. 20, 2008, 199-210, 45.
Saunders, P., "A compact combinatorial device for measurement of nonlinearity of radiation detectors", Int. J. Thermophys., Sep. 24, 2014, 290-302, 36.

* cited by examiner

A)

B)

| First light emitter A Current schedule | Second light emitter B Current schedule | Combinatorial light flux |
|---|---|---|
| A1 ⟶ | B1 | $f(A_1) + f(B_1)$ $= f(A_1 + B_1)$ |

Figure 7

| First light emitter A Current schedule | Second light emitter B Current schedule | Combinatorial light flux |
|---|---|---|
| A1 → | B1 | $f(A_1) + f(B_1)$ <br> $= f(A_1 + B_1)$ |
| | B2 | $f(A_1) + f(B_2)$ <br> $= f(A_1 + B_2)$ |
| | B3 | $f(A_1) + f(B_3)$ <br> $= f(A_1 + B_3)$ |

Figure 9

| First light emitter A<br>Current schedule | | | Second light emitter B<br>Current schedule |
|---|---|---|---|
| $A_1$ | | | $B_1$ |
| $A_2$ | | | $B_2$ |
| $A_3$ | | | $B_3$ |
| $A_4$ | | | $B_4$ |
| $A_5$ | ⋮ | ⋮ | $B_5$ |
| $A_6$ | • | • | $B_6$ |
| $A_7$ | | | $B_7$ |
| $A_8$ | | | $B_8$ |
| $A_9$ | • | • | $B_9$ |
| $A_{10}$ | • | • | $B_{10}$ |
| $A_{11}$ | • | • | $B_{11}$ |
| $A_{12}$ | | | $B_{12}$ |
| $A_{13}$ | | | $B_{13}$ |
| $A_{14}$ | | | $B_{14}$ |
| $A_{15}$ | | | $B_{15}$ |

Figure 11

COMBINATORIAL FLUX ADDER FOR DETERMINING PHOTOVOLTAIC CELL NONLINEARITY

CROSS REFERENCE TO RELATED APPLICATIONS

This application claims the benefit of U.S. Provisional Patent Application Ser. No. 62/236,521, filed Oct. 2, 2015, the disclosure of which is incorporated herein by reference in its entirety.

STATEMENT REGARDING FEDERALLY SPONSORED RESEARCH

This invention was made with United States Government support from the National Institute of Standards and Technology. The Government has certain rights in the invention.

BRIEF DESCRIPTION

Disclosed is a combinatorial flux adder to determine a nonlinear response of a photovoltaic cell, the combinatorial flux adder comprising: a plurality of light emitters comprising: a first light emitter; and a second light emitter; the first light emitter to produce a first light comprising a first photon flux to irradiate the photovoltaic cell, wherein the first photon flux is produced in response to receipt, by the first light emitter, of a first control signal, wherein a first amplitude of the first control signal controls a first magnitude of the first photon flux; the second light emitter to produce a second light comprising a second photon flux to irradiate the photovoltaic cell, wherein the second photon flux is produced in response to receipt, by the second light emitter, of a second control signal, wherein a second amplitude of the second control signal controls a second magnitude of the second photon flux; and a driver in electrical communication with the first light emitter and the second light emitter to provide: the first control signal comprising the first amplitude to the first light emitter, and the second control signal comprising the second amplitude to the second light emitter, wherein the driver controls: during a first singular period, the first light emitter to produce the first photon flux in an absence of the second photon flux from the second light emitter; during a second singular period, the second light emitter to produce the second photon flux in an absence of the first photon flux from the first light emitter; and during a combinatorial period: a first combinatorial flux comprising the first photon flux and the second photon flux, the first light emitter to produce the first photon flux and the second light emitter to produce the second photon flux, and a second combinatorial flux comprising the first photon flux and the second photon flux, the first light emitter to produce the first photon flux and the second light emitter to produce the second photon flux, wherein, the first combinatorial flux and the second combinatorial flux differ in at least one of the first photon flux or the second photon flux.

Also discloses is a process for determining a nonlinear response of a photovoltaic cell, the process comprising: producing a first set of first light pulses, the first light pulses comprising: a first light comprising a first photon flux; and a plurality of different first magnitudes of first photon flux; producing a second set of second light pulses, the second light pulses comprising: a second light comprising a second photon flux; and a plurality of different second magnitudes of second photon flux; repeating the first light pulses in a selected combination with the second light pulses to produce a combinatorial set of combinatorial light pulses, the combinatorial light pulses comprising: a combinatorial light comprising a combinatorial photon flux; and a plurality of different combinatorial magnitudes of combinatorial flux the selected combinations of the first light and the second light; irradiating a photovoltaic cell with the first set in an absence of the second set and the combinatorial set; irradiating the photovoltaic cell with the second set in an absence of the first set and the combinatorial set; irradiating the photovoltaic cell with the combinatorial flux in an absence of the first set and the second set; producing, by the photovoltaic cell, a first photovoltaic output in response to irradiating the photovoltaic cell with the first set in an absence of the second set and the combinatorial set; producing, by the photovoltaic cell, a second photovoltaic output in response to irradiating the photovoltaic cell with the second set in an absence of the first set and the combinatorial set; producing, by the photovoltaic cell, a combinatorial photovoltaic output in response to irradiating the photovoltaic cell with the combinatorial set in an absence of the first set and the second set; relating a photovoltaic output and a magnitude of flux in an overdetermined system of a plurality of linear equations, each linear equation comprising a polynomial equation as $f=\Sigma_{i=0}^{n} r_i s^i$, wherein f is the magnitude of the flux; i is an index of summation; n is an order of the polynomial equation; r is a coefficient; s is the photovoltaic output; the photovoltaic output comprises the first photovoltaic output, the second photovoltaic output, and the combinatorial photovoltaic output; and the magnitude of flux comprises the first photon flux, the second photon flux, and the combinatorial photon flux; and solving the system of linear equations to determine the nonlinear relationship between the photovoltaic output and the magnitude of flux.

BRIEF DESCRIPTION OF THE DRAWINGS

The following descriptions should not be considered limiting in any way. With reference to the accompanying drawings, like elements are numbered alike.

FIG. 7 shows a current schedule for a first light emitter and a second light emitter and corresponding combinatorial light flux for a combinatorial flux adder;
FIG. 9 shows a current schedule for a first light emitter and a second light emitter and corresponding combinatorial light flux for a combinatorial flux adder;
FIG. 11 shows a current schedule for a first light emitter and a second light emitter for a combinatorial flux adder.

DETAILED DESCRIPTION

A detailed description of one or more embodiments is presented herein by way of exemplification and not limitation.

It has been discovered that a combinatorial flux adder determines a nonlinear response of a photovoltaic cell. The combinatorial flux adder can include a light emitter such as a light emitting diode (LED) to obtain the nonlinear relationship between a photovoltaic output (e.g., an output short-circuit current signal) of the photovoltaic cell (e.g., a solar cell) and flux from the light emitter irradiated upon the photovoltaic cell. Fluxes from light emitters produced by controlling supplied currents to light emitters in singularity or in a combination over a range known of unknown fluxes are solved by a linear least squares fit to signal data (i.e., the photovoltaic output from the photovoltaic cell) in a linear overdetermined system of equations based on a polynomial relationship of $N^{th}$ degree. Advantageously and unexpectedly, the combinatorial flux adder determines the nonlinear relationship for a first light emitter and second light emitter. A spectral dependence of the photovoltaic cell is determined by the combinatorial flux adder and was a factor in a degree of nonlinearity in a solar cell. A process for determining the nonlinearity in photovoltaic response includes determining a globally scaled solution for photovoltaic cells.

Figure 1:
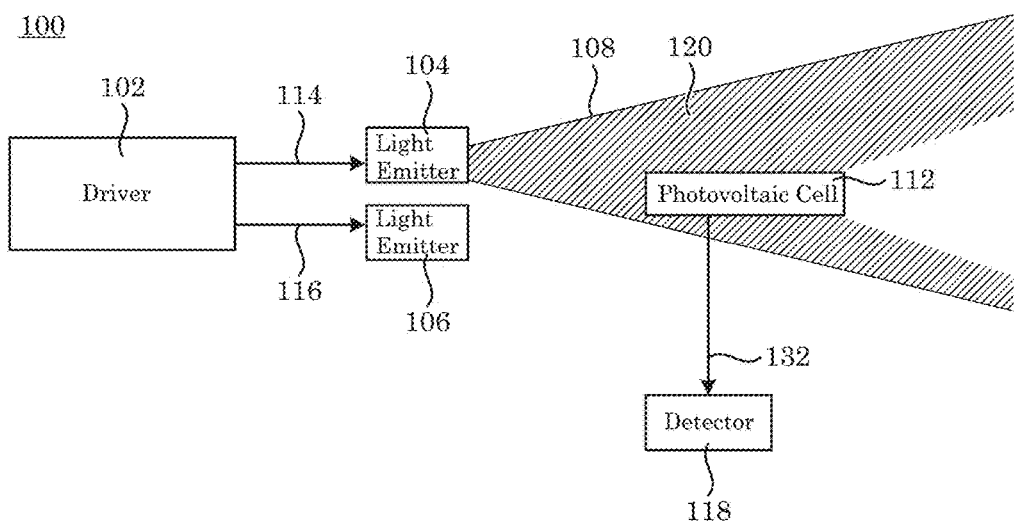
FIG. 1 shows a combinatorial flux adder.
Figure 1:
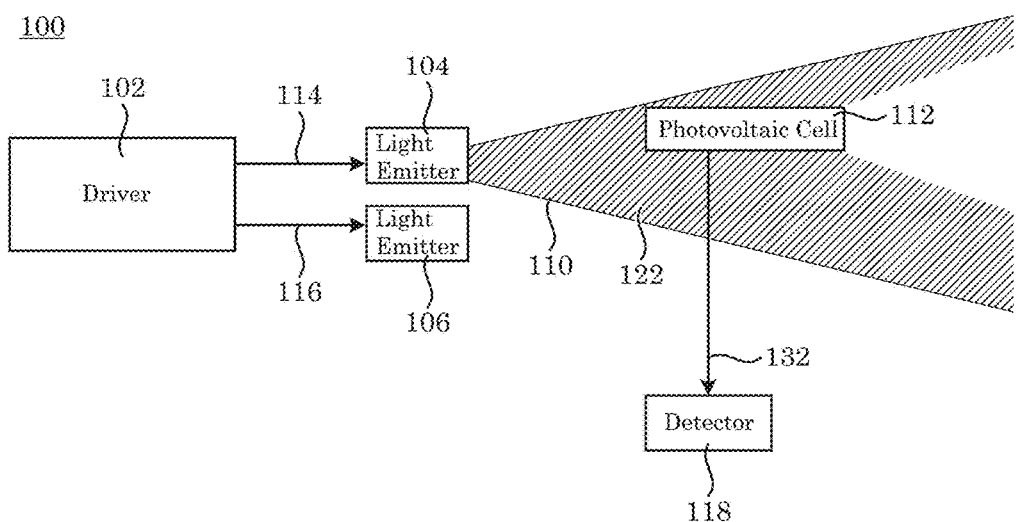
Figure 2:
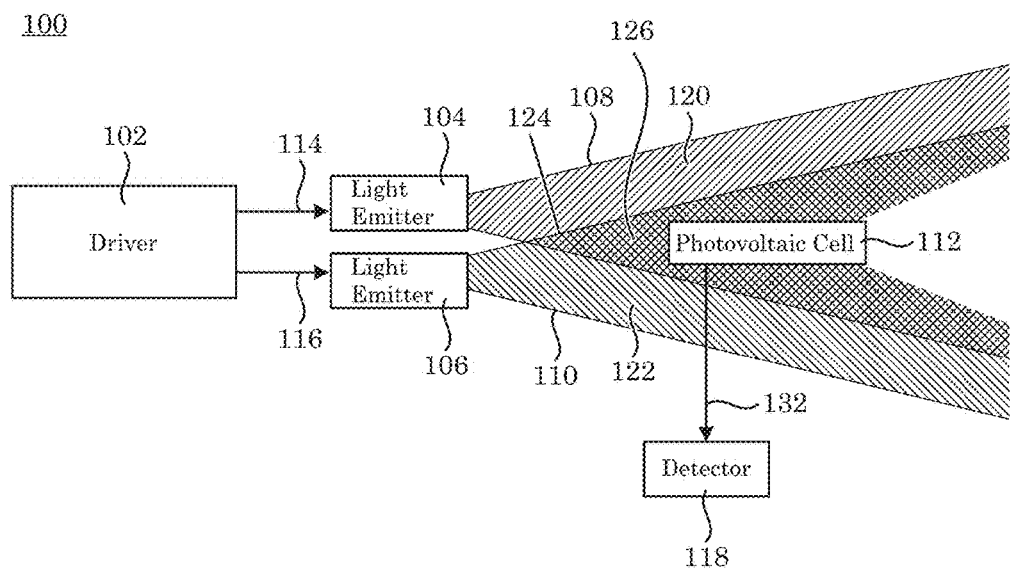
FIG. 2 shows a combinatorial flux adder.

In an embodiment, with reference to FIG. 1 (panel A: during first singular period; panel B: during second singular period) and FIG. 2 (during combinatorial period), combinatorial flux adder 100 includes plurality of light emitters including first light emitter 104 and second light emitter 106. First light emitter 104 produces first light 108 that includes first photon flux 120 to irradiate photovoltaic cell 112. As shown in panel A of FIG. 1, first photon flux 120 is produced in response to receipt, by first light emitter 104, of first control signal 114, wherein a first amplitude of first control signal 114 controls a first magnitude of first photon flux 120. As shown in panel B of FIG. 1, second light emitter 106 produces second light 110 that includes second photon flux 122 to irradiate photovoltaic cell 112. Second photon flux 122 is produced in response to receipt, by second light emitter 106, of second control signal 116, wherein a second amplitude of second control signal 116 controls a second magnitude of second photon flux 122. Combinatorial flux adder 100 also includes driver 102 in electrical communication with first light emitter 104 and second light emitter 106 to provide first control signal 114 including the first amplitude to first light emitter 104 and to provide second control signal 116 including the second amplitude to second light emitter 106. Driver 102 controls, during a first singular period (see, e.g., panel A of FIG. 1), first light emitter 104 to produce first photon flux 120 in an absence of second photon flux 122 from second light emitter 106. During a second singular period (see, e.g., panel B of FIG. 1), driver 102 controls second light emitter 106 to produce second photon flux 122 in an absence of first photon flux 120 from first light emitter 104. During a combinatorial period, as shown in FIG. 2, driver 102 controls first light emitter 104 to produce first photon flux 120 in combination with second light emitter 106 to produce second photon flux 122 to provide first combinatorial flux 126 that includes first photon flux 120 and second photon flux 122. Also, during the combinatorial period, driver 102 controls first light emitter 104 to produce first photon flux 120 in combination with second light emitter 106 to produce second photon flux 122 to provide second combinatorial flux 126 that includes, wherein, first combinatorial flux 126 and second combinatorial flux 126 differ in at least one of the first photon flux or the second photon flux. It will be appreciated that first combinatorial flux 126 is produced at a different time than second combinatorial flux 126 during the combinatorial period.

Combinatorial flux adder 100 further includes photovoltaic cell 112 to receive first photon flux 120 from first light emitter 104 during the first singular period, second photon flux 122 from second light emitter 106 during the second singular period, and the first combinatorial flux and the second combinatorial flux separately during the combinatorial period. Combinatorial flux adder 100 also can include detector 102 to receive photovoltaic output 132 from photovoltaic cell 112.

Figure 3:
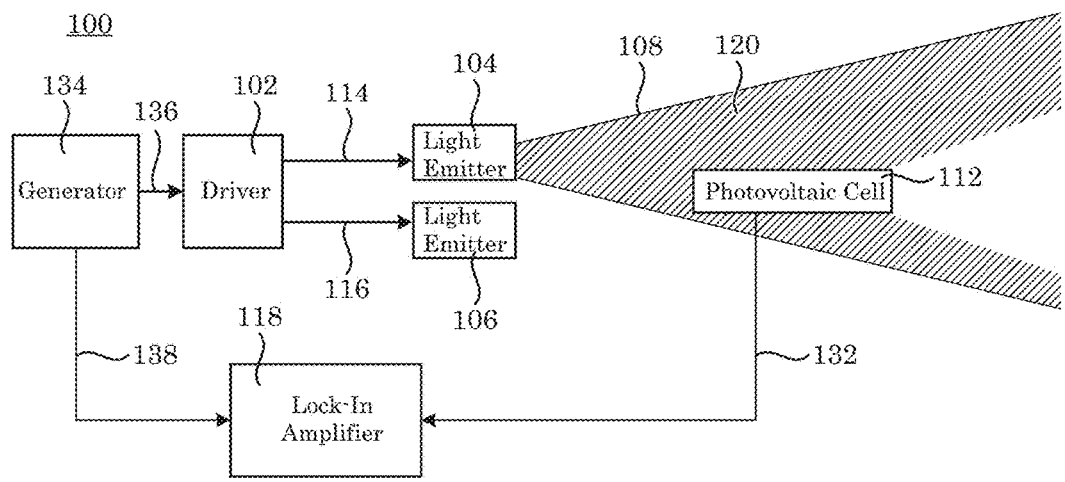
FIG. 3 shows a combinatorial flux adder.
Figure 3:
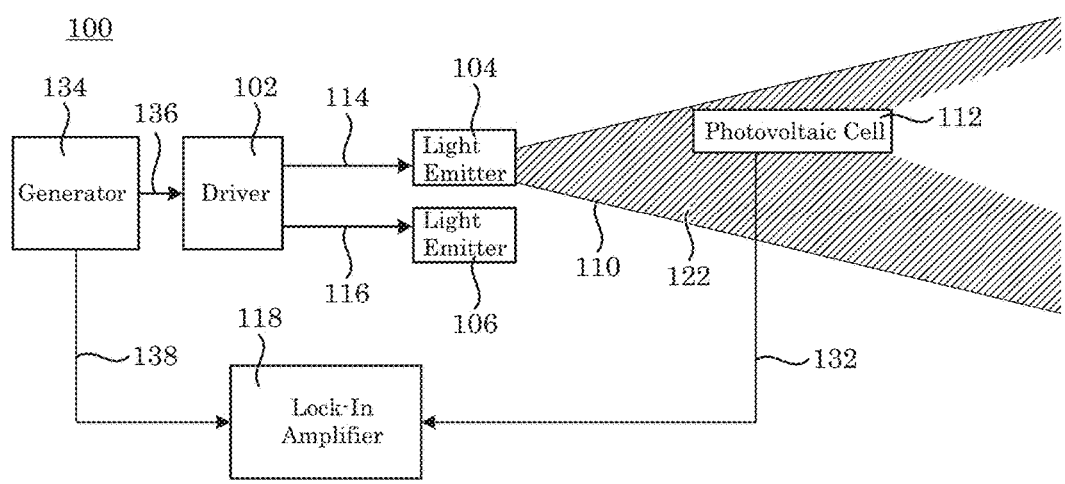
Figure 4:
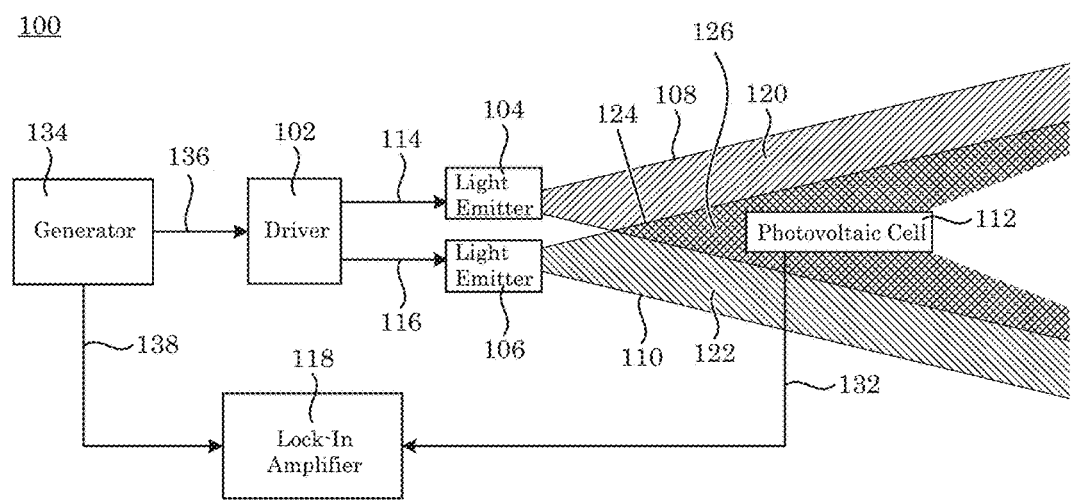
FIG. 4 shows a combinatorial flux adder.

In an embodiment, with reference to FIG. 3 (panel A: during first singular period; panel B: during second singular period) and FIG. 4 (during combinatorial period), detector 118 receives drive waveform 138 that includes a plurality of pulses corresponding to first control signal 114 and second control signal 116. In a certain embodiment, detector 118 receives drive waveform 138 from waveform generator 134, which produces drive waveform 134 and is in electrical communication with detector 118. According to an embodiment, waveform generator 134 is in electrical communication with driver 102 and provide drive waveform 136 to driver 102. Driver 102 produces first control signal 114 and second control signal 116 in response to and controlled by drive waveform 136 from waveform generator 134. Drive waveforms (136, 138) include timing (e.g., pulse width, duty cycle, and the lie) and amplitude information that is encoded in first control signal 114 and second control signal 116.

Figure 5:
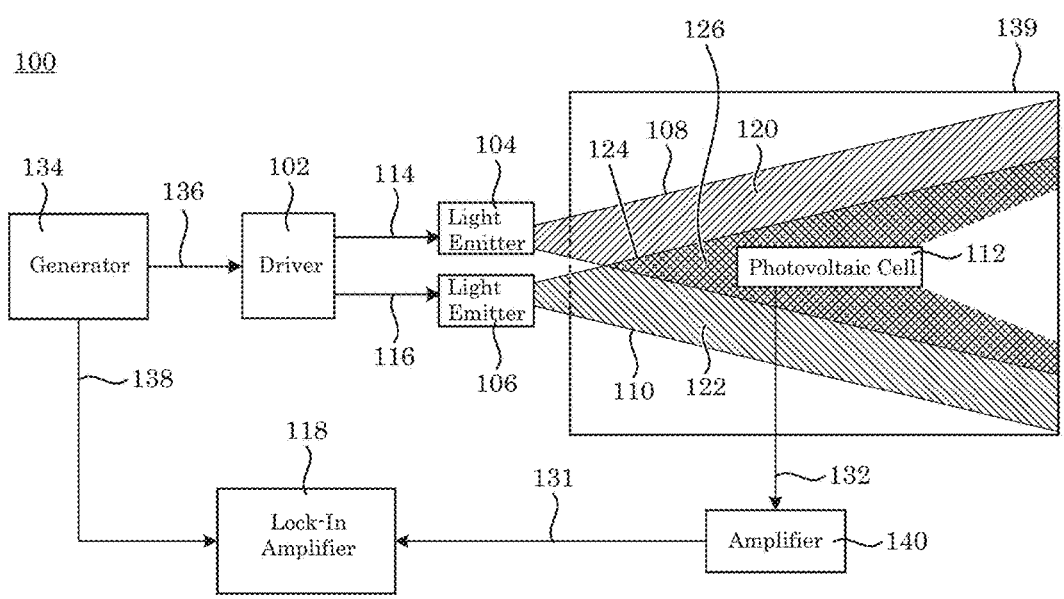
FIG. 5 shows a combinatorial flux adder.

As shown in FIG. 5, combinatorial flux adder 100 can include various other components to provide detection photon flux (e.g., 108, 110, 124, and the like) or acquisition of photovoltaic output 142. Here, photovoltaic cell 112 can be disposed in housing 139 to decrease an amount of optical or electrical noise subjected to photovoltaic cell 112. It is contemplated that housing 139 optically communicates first light 108 from first light emitter 104 and second light 110 from second light emitter 106 to photovoltaic cell 112. Moreover, amplifier 140 can be electrically interposed between and in electrical communication with photovoltaic cell 112 to receive and amplify or discriminate photovoltaic output 132 and to communicate photovoltaic output 131 to detector 118.

Figure 6:
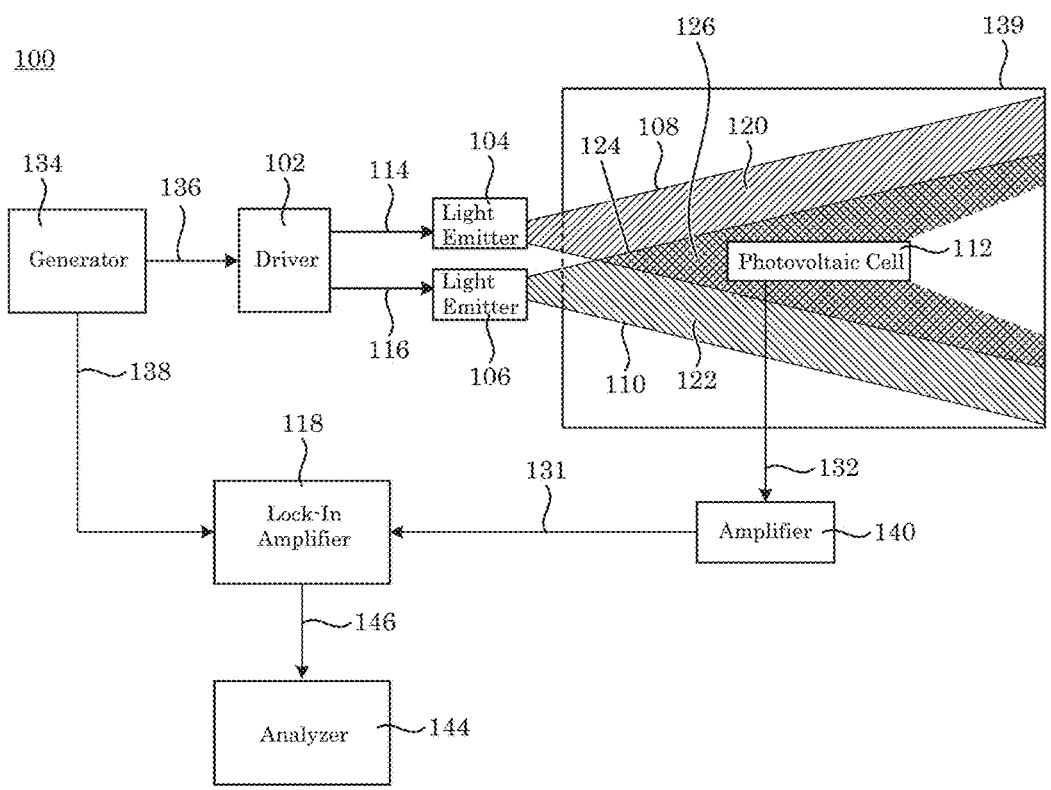
FIG. 6 shows a combinatorial flux adder.

According to an embodiment, with reference to FIG. 6, combinatorial flux adder 100 includes analyzer 144 to determine a nonlinear relationship between photovoltaic output (131 or 132) of photovoltaic cell 112 (produced in response to receipt of first photon flux 112 and second photon flux 122) and a magnitude of flux received by photovoltaic cell 112 from first light 104 and second light 106 that is converted into photovoltaic output 132. In an embodiment, analyzer 144 receives output 146 from detector 118 and relates photovoltaic output 132 and the magnitude of flux in an overdetermined system of a plurality of linear equations. Each linear equation is a polynomial equation as $f=\Sigma_{i=0}^{n} r_i s^i$, wherein f is the magnitude of the flux; i is an index of summation; n is an order of the polynomial equation; r is a coefficient; and s is photovoltaic output 142. Analyzer 144 solves the system of linear equations to determine the nonlinear relationship between photovoltaic output 132 and the magnitude of flux. In an embodiment, photovoltaic output 132 of photovoltaic cell 112 is substantially nonlinear with respect to the magnitude of flux received by photovoltaic cell 112 from the plurality of light emitters (104, 106). In an embodiment, photovoltaic output 132 of photovoltaic cell 112 is substantially linear with respect to the magnitude of flux received by photovoltaic cell 112 from the plurality of light emitters (104, 106).

According to an embodiment, combinatorial flux adder 100 includes a solar cell as photovoltaic cell 112. Here, the solar cell has a substantially nonlinear response with flux irradiated on the solar cell. Further, the plurality of light emitters includes LED lamps, wherein first light emitter 104 is an LED lamp, and second light emitter 106 is an LED lamp. It is contemplated that instead of two LEDs lamps, the plurality of light emitters can be two sets of LED lamps. The LED lamps irradiate the entire solar cell in an overfilled mode while an intensity level, i.e., photon flux, of the LED lamps is controlled by drive current of the LED lamps, wherein the drive current is provided in the control signal, e.g., first control signal 114 and second control signal 116. Combinatorial flux adder 100 provides production of a plurality of different flux levels (i.e., magnitude of flux) of photon flux from the light emitters (e.g., 104, 106, and the like) in absence of separate optical light paths, motorized optical wheels, shutters, neutral density filters, or other hardware or control to create the large set of fluxes. Advantageously and unexpectedly, higher-order corrections of up to 4th degree of a polynomial system of equations provided a solution for a relation between irradiance of photon flux on the solar cell and current output of the solar cell. In an embodiment, the first LED can have a first wavelength (e.g., 627 nm), and the second LED can have a second wavelength (e.g., 890 nm). With the two different wavelengths, wavelength light-bias dependent spectral response of the solar cell was determined by combinatorial flux adder 100.

In an embodiment, with reference again to FIG. 5, which shows a schematic of an LED-based combinatorial flux adder 100, driver 102 is an LED controller with two independent current source channels that controls light emission of two LEDs (104, 106) via control signals (114, 116). In this arrangement, LED (104, 106) independently produces distinct light fluxes (120, 122) or combination flux 124 on photovoltaic cell 112 disposed in housing 139 that provides a dark enclosure for photovoltaic cell 112. In some embodiments, LED (104, 106) is operated in direct current (DC) mode. Here, however, LED (104, 106) is operated in pulsed mode to pulse by pulsing the current to each LED provided by control signal (114, 116). As a result, combinatorial flux adder 100 produces pulsed light modulation from first light emitter 104 and second light emitter 106 irradiating photovoltaic cell 112, wherein photovoltaic cell 112 provides an AC short-circuit current ($I_{sc}$) as photovoltaic output 132 in each solar cell disposed as photovoltaic cell 112. The output current that is photovoltaic output 132 from photovoltaic cell 112 is converted to a voltage signal 131 via current-to-voltage transimpedance amplifier 140 with fixed gain and measured by lock-in amplifier 118. A design of transimpedance amplifier 140 maintains photovoltaic cell 112 at $I_{sc}$ for photovoltaic output 132. Both LED controller 102 and lock-in amplifier 118 are triggered by signal generator 134 via signal (136, 138). A pulsing frequency of signal generator 134 for driving LEDs (104, 106) was set to a selected frequency (here, 97 Hz) but can be selected to be any frequency to which photovoltaic cell 112 responds. Pulsed excitation measurements of photovoltaic output 132 provide stability of the LED signal and good signal to noise detection with lock-in amplifier detector 118. A computer or processor (not shown) runs control code to control the components of combinatorial flux adder 100. Furthermore, lock-in detector 118 detected output 132 linearly, i.e., the output signal of lock-in detector 118 was linear in response to a magnitude of photovoltaic output 132 received from amplifier 140. Here, first light emitter 104 and second light emitter 106 respectively were monochromatic LEDs, with respective wavelengths for first light 108 peaked at 627 nm- and peaked LEDs and second light 110 peaked at 890 nm with full-width at half max (FWHM) bandwidths of 17 nm and 50 nm, respectively. In some embodiments, combinatorial flux adder 100 includes a combination of LEDs that provide combinatorial light 124 as "white" light or a broadband spectrum.

Combinatorial flux adder 100 includes the plurality of light emitters (e.g., 104, 106) to emit a plurality of light (e.g., first light 108, second light 110) and to produce combinatorial light 124. The light emitters are selected to provide a stable, quasi(monochromatic) light output over a large range of flux or intensity levels. Exemplary light emitter includes a light emitting diode, a flash lamp, a laser, an incandescent light, a light emitting plasma, or a combination comprising at least one of the foregoing light emitters.

In an embodiment, light emitted by the plurality of light emitters includes substantially identical wavelengths. According to an embodiment, first light 108 includes a first wavelength; second light 110 includes a second wavelength, and the first wavelength is different than the second wavelength. In a certain embodiment, first light 108 and second light 110 do not spectrally overlap in wavelength. In some embodiments, first light 108 and second light 110 spectrally overlap in wavelength.

The wavelength of the plurality of light emitters independently can be from 200 nm to 1100 nm, including a range of responsivity for many inorganic (e.g., Si, GaAs, CdTe) or organic solar cells and optical sensors. Light emitters with wavelength emission range from 200 nm to 1800 nm cover the responsivity range for many multi-junction solar cells and optical sensors.

The light emitters independently can emit in DC mode or AC mode. In an embodiment, first light emitter 104 and second light emitter 110 emit light in DC mode. In a certain embodiment, first light emitter 104 and second light emitter emit light in AC mode. According to an embodiment, first light emitter 104 emits light in AC mode, and second light emitter 110 emit light in DC mode. In AC mode, a pulse frequency of the light emitters can be from 1 mHz to 1 MHz, specifically from 30 Hz to 200 Hz, and more specifically a prime number such as 43 Hz or 97 Hz. A pulse width of light pulses from the light emitters in AC mode can be from 1 µs to 100 s, specifically from 0.1 s to 0.001 s, and more specifically from 0.01 s to 0.005 s. The photon flux (e.g., 112, 122, 126) from the light emitters (104, 106) can be from 0.005 $W/m^2$ to 10000 $W/m^2$.

A shape and size of the light emitters can be any shape or size that provides full illumination of a photoactive conversion area photovoltaic cell 112. The shape can be flat, spherical, projected, and the like. The light emitters can be packaged in a monolithic structure or can be multiple pieces.

A number of light emitters can be any number selected to provide combinatorial light 124 as well as first light 108 and second light 110. It is contemplated that the number of light emitters can be from 2 to 1000 specifically from 2 to 10, and more specifically 2. In an embodiment, first light 104 is a single light emitter. In a certain embodiment, first light 104 is a plurality of light emitters. In an embodiment, second light 106 is a single light emitter. In a certain embodiment, second light 106 is a plurality of light emitters. The plurality of light emitters can be arranged linearly or in an array format. In the array format, an arrangement of the light emitters can be a regular array (e.g., arranged in rows or columns) or irregular array (e.g., light emitters arranged in random positions). A spacing among neighboring light emitters can be selected based on providing for wiring, cooling etc.

The light emitters can be set up in a free space optics format with or without lenses or mirrors, or they can be coupled to a light guide such as a quartz light pipe or a liquid light guide or a fiber optics cable, all enabling transport of the light output by total internal reflection from the location of emission to location of the photovoltaic device.

Combinatorial flux adder 100 includes driver 102 to provide control signals (114, 116) to drive the light emitters (104, 106). Exemplary drivers 102 include fixed current drivers, variable constant current drivers, current-limited power supplies, or a combination comprising at least one of the foregoing drivers.

In an embodiment, control signals (114, 116) are selectively tailored by driver 102 to drive respective light emitters (104, 106) in a controlled manner for production of first light 108 and second light 110 having the magnitude of first photon flux 120 and second photon flux 122 as well as combinatorial light 124 where the selected combinatorial photon flux 126.

Here, driver 102 outputs control signals (114, 116) with a selected amplitude of current to drive light emitters (104, 106) to output a corresponding magnitude of flux. Further, driver 102 controls the light emitters independently to emit in DC mode or AC mode. The pulse frequency of the control signal (114, 116) from driver 102 independently can be from 1 mHz to 1 MHz, specifically from 1 Hz to 1 kHz, and more specifically from 30 Hz to 200 Hz. A pulse width of control signals (114, 116) from driver 100 to independently can be from 1 µs to 100 s, specifically from 0.1 s to 0.001 s, and more specifically from 0.01 s to 0.005 s In an embodiment, driver 102 can be packaged monolithically with the light emitters or can be packaged separately from the light emitters.

In an embodiment, photovoltaic cell 112 of combinatorial flux adder 100 includes a solar cell, a photodiode, a photodetector, a photomultiplier tube or any photocurrent generating sensor. Exemplary photovoltaic cells include inorganic solar cells such as silicon and gallium arsenide or organic solar cells such as dye-sensitized solar cells. Photovoltaic cell 112 is chemically and physically stable during the course of the measurement.

It is contemplated that the photovoltaic cell is operated under short circuit conditions.

Photovoltaic cell 112 outputs photovoltaic output 132. Photovoltaic output 132 can be a current that includes a DC or AC component and is stable under a given flux.

Photovoltaic cell 112 can include a number of cells connected in series or in parallel. The size of the cells ranges from a few µm to tens of cm. The size of a module or series of connected cells can range from a few of centimeters to a few meters.

Combinatorial flux adder 100 includes detector 118 to receive photovoltaic output (131 or 132) from photovoltaic cell 112. Exemplary detectors include an ammeter, a lock-in amplifier, a shunt resister connected to a voltmeter, or a combination comprising at least one of the foregoing detectors. In an embodiment, detector 118 includes a phase sensitive detector that locks to drive waveform 138 from signal generator 134 and selectively detects photovoltaic output 132 based on a frequency of drive waveform 134.

Detector 118 has a linear response with input signal 132 over the range of the signal. It is contemplated that detector 118 has a bandwidth to detect signal 132 at its operating frequency.

Detector 118 outputs 146. Output 146 is an array of digital data that includes properties of the signal recorded by detector 118. This output also can include statistical information such as the standard deviation of the measured signal for each flux measurement. In an embodiment, output 146 includes a frequency, an amplitude in volts, or a phase in degrees of the signal processed by detector 118.

Amplifier 140 can be electrically interposed between photovoltaic cell 112 and detector 118 to receive photovoltaic output 132 from photovoltaic cell 112 and to communicate photovoltaic output 131 to detector 118. Exemplary amplifiers include a transimpedance amplifier, a shunt resistor, a current-to-voltage converter or a combination comprising at least one of the foregoing amplifiers. In an embodiment, amplifier 140 includes the transimpedance amplifier.

Amplifier 140 is used to amplify the photovoltaic signal 132 and outputs the processed signal 131 to detector 118.

It is contemplated that amplifier 140 provides a low impedance to photovoltaic signal 132. Furthermore, amplifier 140 has an amplification gain or various gain stages with proper bandwidth suitable for the operating frequency of the photovoltaic signal 132.

Output 131 from amplifier 140 is voltage signal that is proportional to signal 132 by a fixed value.

In an embodiment, combinatorial flux adder 100 includes signal generator 134 in electrical communication with driver 102 and detector 118 to provide drive waveforms (136, 138) thereto. Exemplary signal generators include a function generator, a pitch generator, a digital pattern generator, or a combination comprising at least one of the foregoing signal generators. In an embodiment, signal generator 134 includes the function generator.

Signal generator 134 is an electronic instrument that produces a periodic or random electronic signal in either digital or analog form.

It is contemplated that signal generator 134 produces a signal (136 or 138) that serves as a trigger signal for driver 102 and also for detector 118.

Drive waveforms (136, 138) from signal generator 134 are periodic functions in the time domain. In one embodiment, the drive waveform is a square wave with a 50% duty cycle at an operating frequency of 97 Hz.

In an embodiment, combinatorial flux adder 100 includes analyzer 144 in electrical communication with detector 118 to receive output 146 from detector 118 and driver 102 to receive control signal data 150 from driver 102. Exemplary analyzers include a microprocessor, a data acquisition system, a computer, or a combination comprising at least one of the foregoing analyzers. In an embodiment, analyzer 144 includes the computer.

Analyzer is a clock driven programmable electronic instrument that receives digital data, stores the data or processes data based on given instructions.

It is contemplated that analyzer 144 is programmed to record signal 146 for every flux setting and every signal measurement. Signal 146 includes the information processed by detector 118.

Control signal data 150 from driver 102 include magnitudes of supplied signals 114 and 116 to the light emitters.

Combinatorial flux adder 100 can be made by choosing and installing two light emitters 104 and 106 that are electrically connected to driver 102. Light emitters 104 and 106 are oriented to fully illuminate photovoltaic cell 112 for the singular period or combinatorial period measurements. Furthermore, driver 102 is electronically triggered by signal generator 134 via signal 136. Photovoltaic cell 112 receives fluxes 120, 122 and 126 is electrically connected to amplifier 140. Amplifier 140 is connected so output signal 131 is received by detector 118. Detector 118 also receives a trigger signal 138 from signal generator 134. The output of detector 118 is signal 146 that is recorded and analyzed by analyzer 144. Connection can be made by a cable for digital signal transfer.

The processes and articles herein have numerous beneficial uses, including determining a nonlinear response of a photovoltaic cell 112. As used herein, "linear response" of photovoltaic cell 112 refers to a linear relationship that exists between incident photon flux irradiated on photovoltaic cell 112 and photovoltaic output 132 (e.g., photocurrent) of photovoltaic cell 112. As used herein, "nonlinear response" of photovoltaic cell 112 refers to a mathematical relationship between incident photon flux and the photovoltaic output signal 132 that is of any functional form other than a linear mathematical function. It will be appreciated that linearity is considered in context of measurement sensitivity, measurement uncertainty, measurement range of parameters, and the like. A linearity or nonlinearity of this relationship can inform understanding or modeling charge carrier recombination phenomena or defects on a performance of photovoltaic cell 112. It is contemplated that a reference solar cell or detector to measure an output of other test cells or modules have a linear short circuit current ($I_{sc}$) output as a function of incident irradiance over a range of flux selected to determine nonlinear behavior. Since a plane of incidence of irradiance of photon flux is selected and monitored using $I_{sc}$ measurements of a reference cell, combinatorial flux adder 100 advantageously and unexpectedly provides whether such devices have a linear output with irradiance, e.g., over a standard reporting condition (SRC). Additionally, combinatorial flux adder 100 determines if the reference cell is not linear and irradiance measurements of the device acquired by combinatorial flux adder 100 can be corrected by a mathematical relationship between the signal and the flux as determined by combinatorial flux adder 100.

Certain silicon-based reference solar cells show a linear behavior at irradiance levels near the SRC air mass (AM) 1.5 spectrum with total irradiance of 1000 Wm$^{-2}$ and temperature fixed at 25° C., but this is not always the case. Moreover, at very low light levels or under very concentrated irradiance conditions, the linearity assumption can fail. Combinatorial flux adder 100 provides whether a particular device is nonlinear over a certain irradiance range and also provides a precise relationship between the photocurrent from the device and the irradiance. From this functional form provided by combinatorial flux adder 100, combinatorial flux adder 100 further provides an exact $I_{sc}$ of the device under a given irradiance level or spectrum. A way to express device nonlinearity over a large range of intensity levels is to plot a ratio of signal (i.e., photovoltaic output 132, the short circuit current $I_{sc}$) to irradiance flux (i.e., combinatorial flux 126) as a function of signal. If no nonlinearity is present, this ratio remains constant as a function of signal. In nonlinear devices, the ratio changes as a function of signal. The ratio is related to the spectral response, $R(\lambda)$, of photovoltaic cell 112 at a given wavelength if the incident radiation (108, 112, 124) is monochromatic. For a broadband spectrum of light such as the AM 1.5 global conditions, the AM 1.5-weighted spectral response of photovoltaic cell 112 is determined and plotted as a function of photovoltaic output 112 as $I_{sc}$.

In an embodiment, a process for determining a nonlinear response of a photovoltaic cell includes producing a first set of first light pulses, the first light pulses including; first light 104 that includes first photon flux 120; and a plurality of different first magnitudes of first photon flux. The process also includes producing a second set of second light pulses that include second light 110 including second photon flux 122 with a plurality of different second magnitudes of second photon flux 122. The process includes repeating the first light pulses in a selected combination with the second light pulses to produce a combinatorial set of combinatorial light pulses in which the combinatorial light pulses include combinatorial light 124 including combinatorial photon flux 126 and a plurality of different combinatorial magnitudes of combinatorial flux 126 of the selected combinations of first light 108 and second light 110. The process further includes irradiating photovoltaic cell 112 with the first set in an absence of the second set and the combinatorial set; irradiating photovoltaic cell 112 with the second set in an absence of the first set and the combinatorial set; and irradiating photovoltaic cell 112 with combinatorial flux 126 in an absence of the first set and the second set. The process additionally includes producing, by photovoltaic cell 112, a first photovoltaic output in response to irradiating photovoltaic cell 112 with the first set in an absence of the second set and the combinatorial set; producing, by photovoltaic cell 112, a second photovoltaic output in response to irradiating photovoltaic cell 112 with the second set in an absence of the first set and the combinatorial set; and producing, by photovoltaic cell 112, a combinatorial photovoltaic output in response to irradiating photovoltaic cell 112 with the combinatorial set in an absence of the first set and the second set. The process also includes relating photovoltaic output 132 and a magnitude of flux in an overdetermined system of a plurality of linear equations, each linear equation comprising a polynomial equation as $f=\Sigma_{i=0}^{n} r_i s^i$, wherein f is the magnitude of the flux; i is an index of summation; n is an order of the polynomial equation; r is a coefficient; s is photovoltaic output 132; photovoltaic output 132 includes the first photovoltaic output, the second photovoltaic output, and the combinatorial photovoltaic output; and the magnitude of flux includes first photon flux 120, second photon flux 122, and combinatorial photon flux 126. The process also includes solving the system of linear equations to determine the nonlinear relationship between photovoltaic output 132 and the magnitude of flux.

The process for determining a nonlinear response of a photovoltaic cell also can include: providing first control signal 114 (that includes a first drive waveform and a first amplitude) to first light emitter 104 to produce the first set of first light pulses by first light emitter 104; providing second control signal 116 (that includes a second drive waveform to second light emitter 106) to produce the second set of second light pulses by second light emitter 106; and providing a combinatorial control signal (including a third drive waveform and a fourth drive waveform) to produce the combinatorial set of combinatorial light pulses, wherein the third drive waveform is provided to first light emitter 104, and the fourth drive waveform is provided to second like emitter 106.

Determining a nonlinear response of a photovoltaic cell also can include controlling the first magnitude of first photon flux 120 by the first amplitude of first control signal 114; and controlling the second magnitude of second photon flux 122 by the second amplitude of second control signal 116.

In some embodiments of the process for determining a nonlinear response of a photovoltaic cell, at least one of the first light pulses includes a calibrated value of first photon flux, and solving the system of linear equations includes a scaled solution of the nonlinear relationship between photovoltaic output 132 and the magnitude of flux, based on the calibrated value of first photon flux 108.

In some embodiments of the process for determining a nonlinear response of a photovoltaic cell, first light emitter 104 includes a first light emitting diode to produce a first wavelength; second light emitter 106 includes a second light emitting diode to produce a second wavelength, and the first wavelength is different from the second wavelength.

Figure 8:
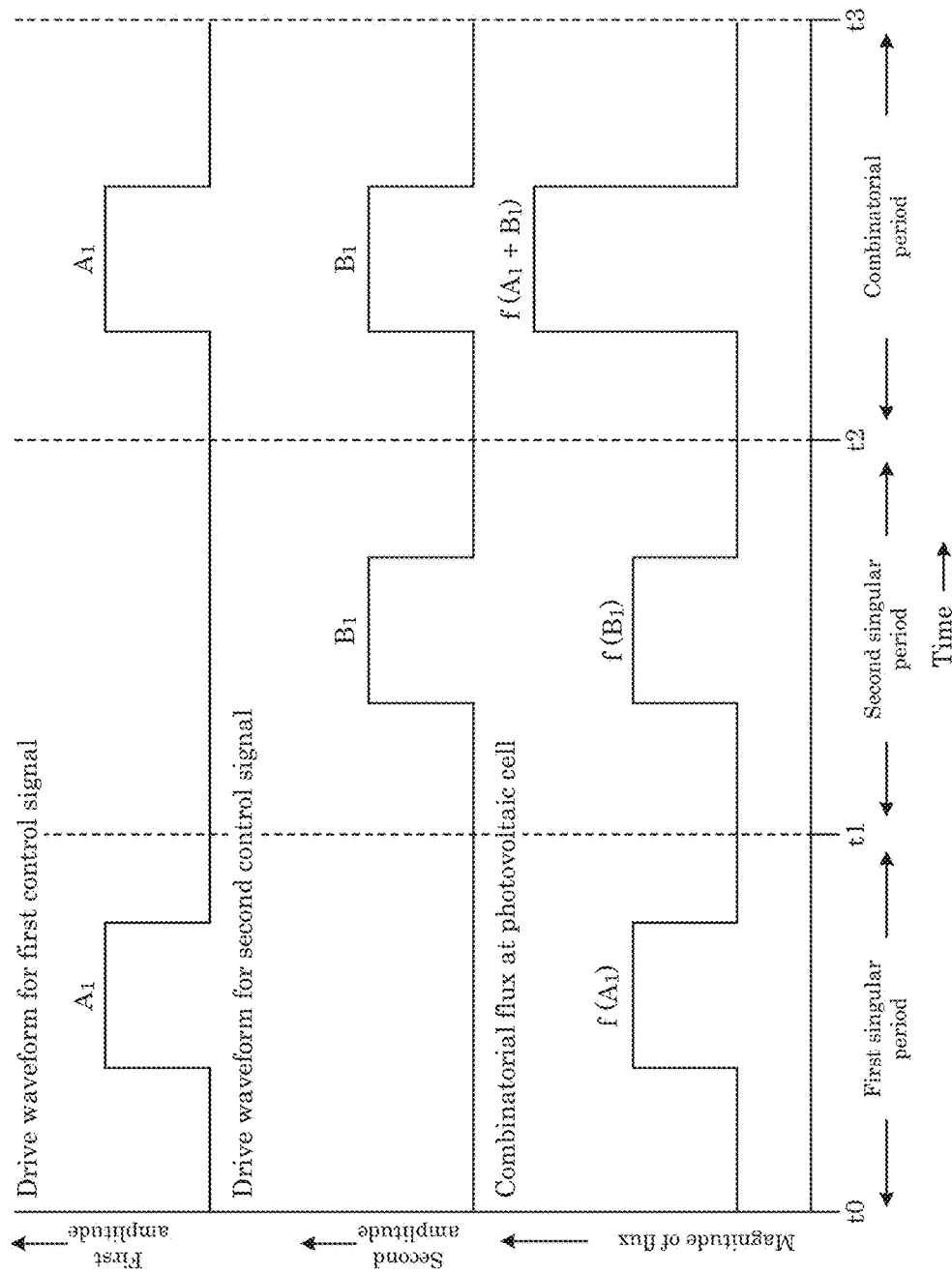
FIG. 8 shows a graph of a drive waveform for a first control signal, a drive waveform for a second control signal, and a combinatorial flux at a photovoltaic cell according to the current schedule shown in FIG. 7.

In an embodiment of a process for producing first light 108, second light 110, and combinatorial light 124, with reference to FIG. 7 (a current schedule of first lighter emitter A and second light emitter B) and FIG. 8 (a graph of drive waveforms for control signals and resulting photon flux at photovoltaic cell 112), the process is an algorithm for driver 102 and control signals (output to light emitters (104, 106) that includes producing, by driver 102, a drive waveform for first control signal 114 and a drive waveform for second control signal 116. The drive waveforms cover first singular period from time t0 to time t1, second singular period from time t1 to time t2, and combinatorial period from time t2 to time t3. During first singular period (i.e., a period in which only first light emitter 104 emits light), first control signal 114 includes a pulse having amplitude A1 that is communicated from driver 102 to first light emitter 104, and first light emitter 104 produces first light 108 having first photon flux f(A1) at photovoltaic cell 112 in an absence of second photon flux 122. During second singular period (i.e., a period in which only second light emitter 106 emits light), second control signal 116 includes a pulse having amplitude B1 that is communicated from driver 102 to second light emitter 106, and second light emitter 106 produces second light 110 having second photon flux f(B1) at photovoltaic cell 112 in an absence of first photon flux 120. During the combinatorial period (i.e., a period in which first light emitter 104 and second light emitter 106 emit light), first control signal 114 includes a pulse having amplitude A1, and second control signal 116 includes a pulse having amplitude B1, which are communicated from driver 102 respectively to first light emitter 104 and second light emitter 106. In response, first light emitter 104 produces first light 108 having first photon flux f(A1), and second light emitter 106 produces second light 110 having second photon flux f(B1) in combination as combinatorial light 124 having a magnitude of combinatorial photon flux f(A1+B1) at photovoltaic cell 112.

Figure 10:
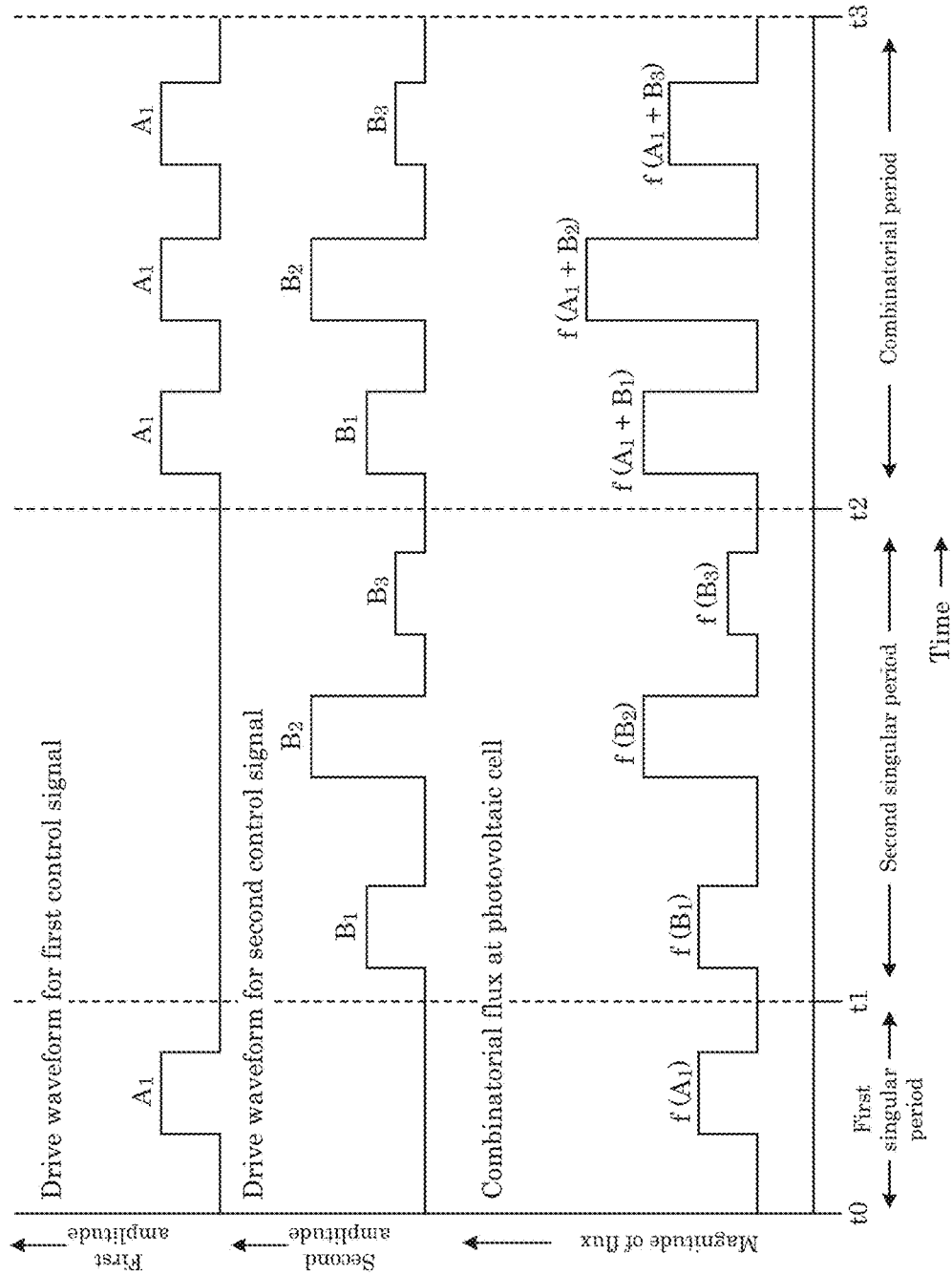
FIG. 10 shows a graph of a drive waveform for a first control signal, a drive waveform for a second control signal, and a combinatorial flux at a photovoltaic cell according to the current schedule shown in FIG. 9.

In an embodiment of a process for producing first light 108, second light 110, and combinatorial light 124, with reference to FIG. 9 (a current schedule of first lighter emitter A and second light emitter B) and FIG. 10 (a graph of drive waveforms for control signals and resulting photon flux at photovoltaic cell 112), the process is an algorithm for driver 102 and control signals (output to light emitters (104, 106) that includes producing, by driver 102, a drive waveform for first control signal 114 and a drive waveform for second control signal 116. The drive waveforms cover first singular period from time t0 to time t1, second singular period from time t1 to time t2, and combinatorial period from time t2 to time t3. During first singular period (i.e., a period in which only first light emitter 104 emits light), first control signal 114 includes a pulse having amplitude A1 that is communicated from driver 102 to first light emitter 104, and first light emitter 104 produces first light 108 having first photon flux f(A1) at photovoltaic cell 112 in an absence of second photon flux 122. During second singular period (i.e., a period in which only second light emitter 106 emits light), second control signal 116 includes a pulses having amplitudes B1, B2, and B3 that are communicated from driver 102 to second light emitter 106, and second light emitter 106 produces pulses of second light 110 having second photon fluxes f(B1), f(B2), and f(B3) at photovoltaic cell 112 in an absence of first photon flux 120. During the combinatorial period (i.e., a period in which first light emitter 104 and second light emitter 106 emit light), first control signal 114 includes a pulse having amplitude A1, and second control signal 116 includes pulse having amplitudes B1, B2, and B3, which are communicated from driver 102 respectively to first light emitter 104 and second like emitter 106. In response, first light emitter 104 produces first light 108 having first photon flux f(A1), and second light emitter 106 produces second light 110 having second photon fluxes f(B1), f(B2), and f(B3) in combination as three pulses of combinatorial light 124 having respective magnitudes of combinatorial photon flux f(A1+B1), f(A1+B2), and f(A1+B3) at photovoltaic cell 112.

Figure 12:
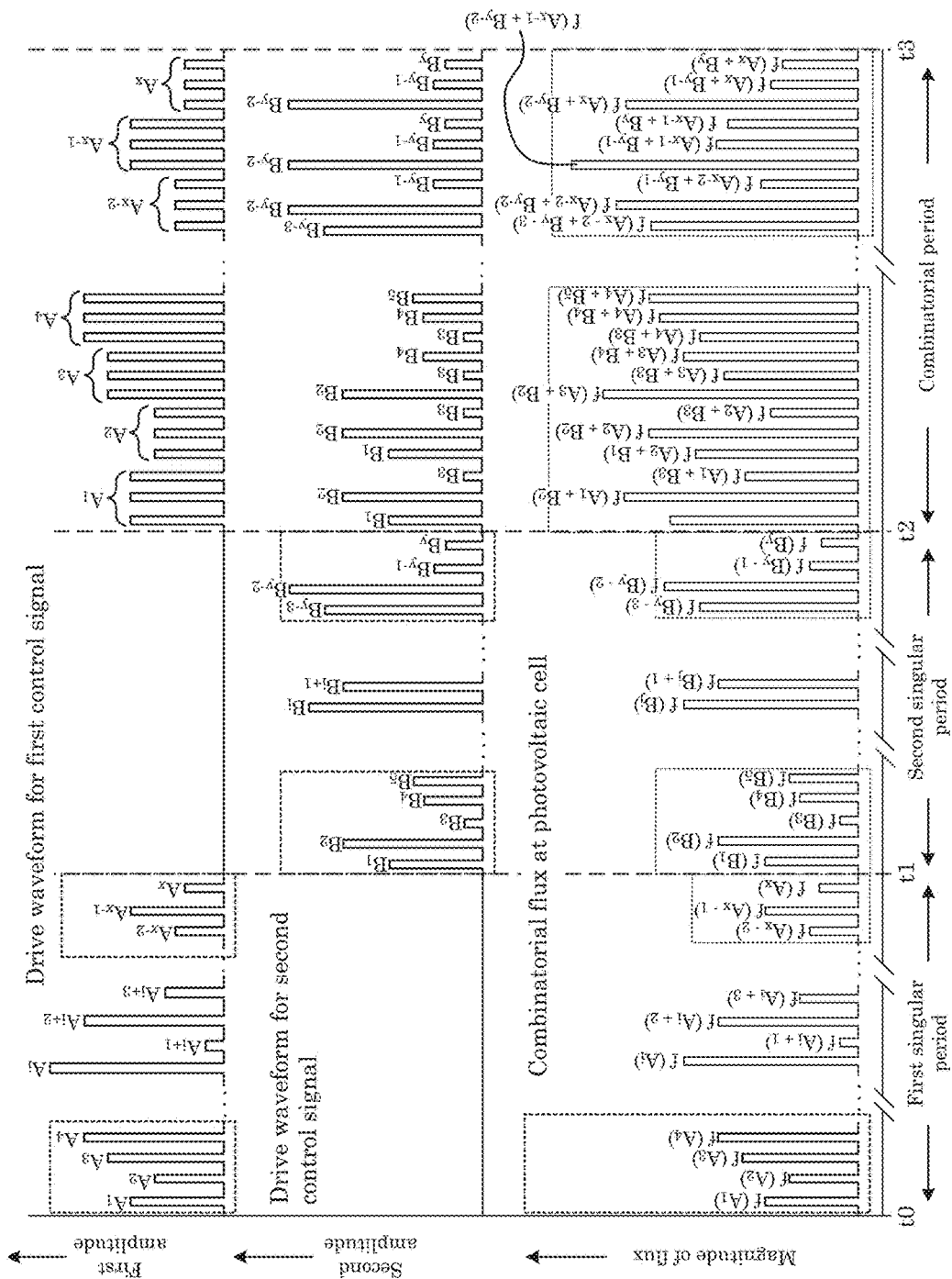
FIG. 12 shows a graph of a drive waveform for a first control signal, a drive waveform for a second control signal, and a combinatorial flux at a photovoltaic cell according to the current schedule shown in FIG. 11.

In an embodiment of a process for producing first light 108, second light 110, and combinatorial light 124, with reference to FIG. 11 (a current schedule of first lighter emitter A and second light emitter B) and FIG. 12 (a graph of drive waveforms for control signals and resulting photon flux at photovoltaic cell 112), the process is an algorithm for driver 102 and control signals (output to light emitters (104, 106). The algorithm was used to create different combinations of fluxes as shown in FIG. 11 in tabular form and as waveforms in FIG. 12. It is contemplated that other combinations can be made as long as the measured signals (i.e., photovoltaic output 132) are tracked with the order in which the fluxes were received by photovoltaic cell 112. Flux or intensity level is set by control signal (114, 116). Here, during a first singular period, 15 unique pulsed current levels were sourced to LED A as first light emitter 104 in a sequential way, and the short circuit current signal 132 from solar cell 112 was measured. The first singular period was followed by a second singular period in which 15 current levels in second control signal 116 was provided to LED B a second light emitter 106 in a similar manner, and the $I_{sc}$ signal as photovoltaic output 132 from photovoltaic cell 112 was required. During the combinatorial period, combinations of these currents (i.e., A1, . . . , A15 and B1, . . . , B15) were applied to the LEDs as shown in FIG. 11 and FIG. 12 (wherein $A_x$=A15, and $B_y$=B15). In FIG. 11, each supplied current to first light emitter 104 in the left column is paired with 3 adjacent currents to second light emitter 106 in the right column. Values of adjacent currents can be chosen close together. Here, 45 (=15×3) combinatorial fluxes 126 were irradiated on photovoltaic cell 112 and produced 45 signals as photovoltaic output 132. In total, 75 (=15+15+45) total data points were measured. These data were analyzed as described herein.

Figure 13:
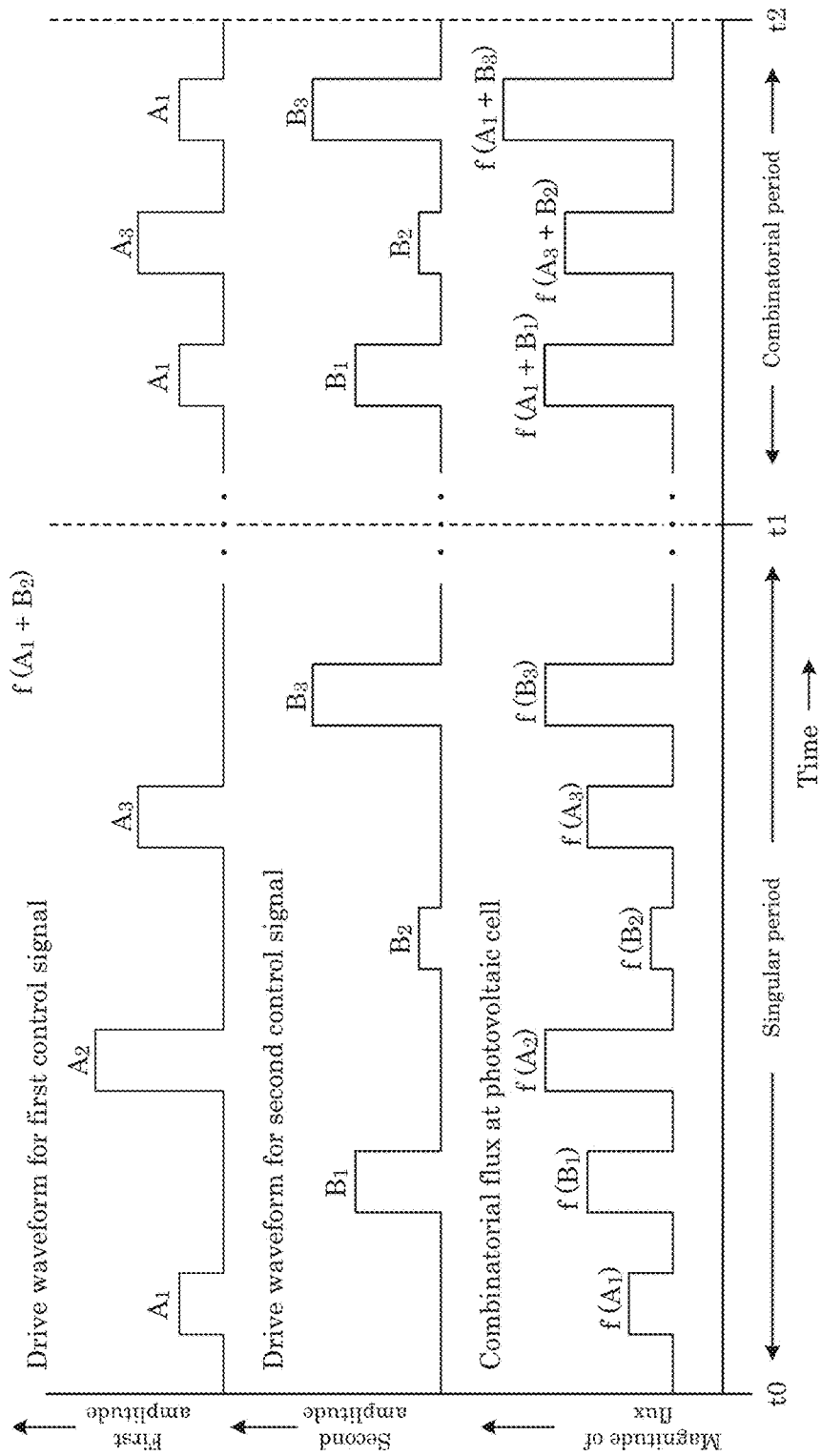
FIG. 13 shows a graph of a drive waveform for a first control signal, a drive waveform for a second control signal, and a combinatorial flux at a photovoltaic cell.
Figure 14:
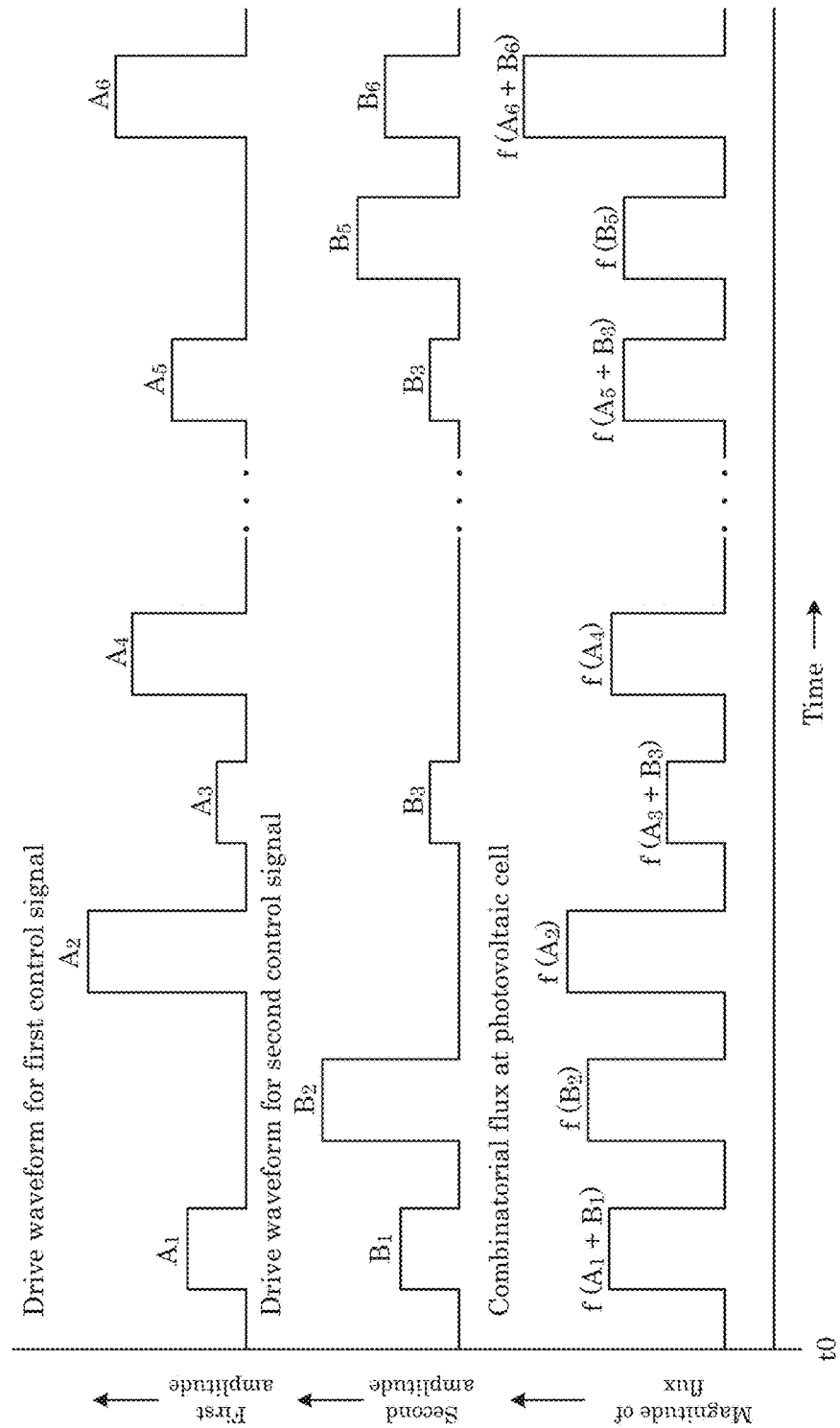
FIG. 14 shows a graph of a drive waveform for a first control signal, a drive waveform for a second control signal, and a combinatorial flux at a photovoltaic cell.

FIG. 7, FIG. 8, FIG. 9, FIG. 10, FIG. 11, and FIG. 12 show emission from first light emitter 104 and emission from second light emitter 106 occurring separately during the first singular period in the second singular period, and the combinatorial lighting produced separately during the combinatorial period. In an embodiment, with reference to FIG. 13, emission from first light emitter 104 and emission from second light emitter 106 can be interleaved during a singular period with combinatorial light produced during a combinatorial period. In an embodiment, with reference to FIG. 14, emission from first light emitter 104 and emission from second light emitter 106 can be interleaved with combinatorial light. In each case, the sequence of emission pulses from first light emitter 104 and second light emitter 106 is tracked temporally relative to production of photovoltaic output 132.

Figure 15:
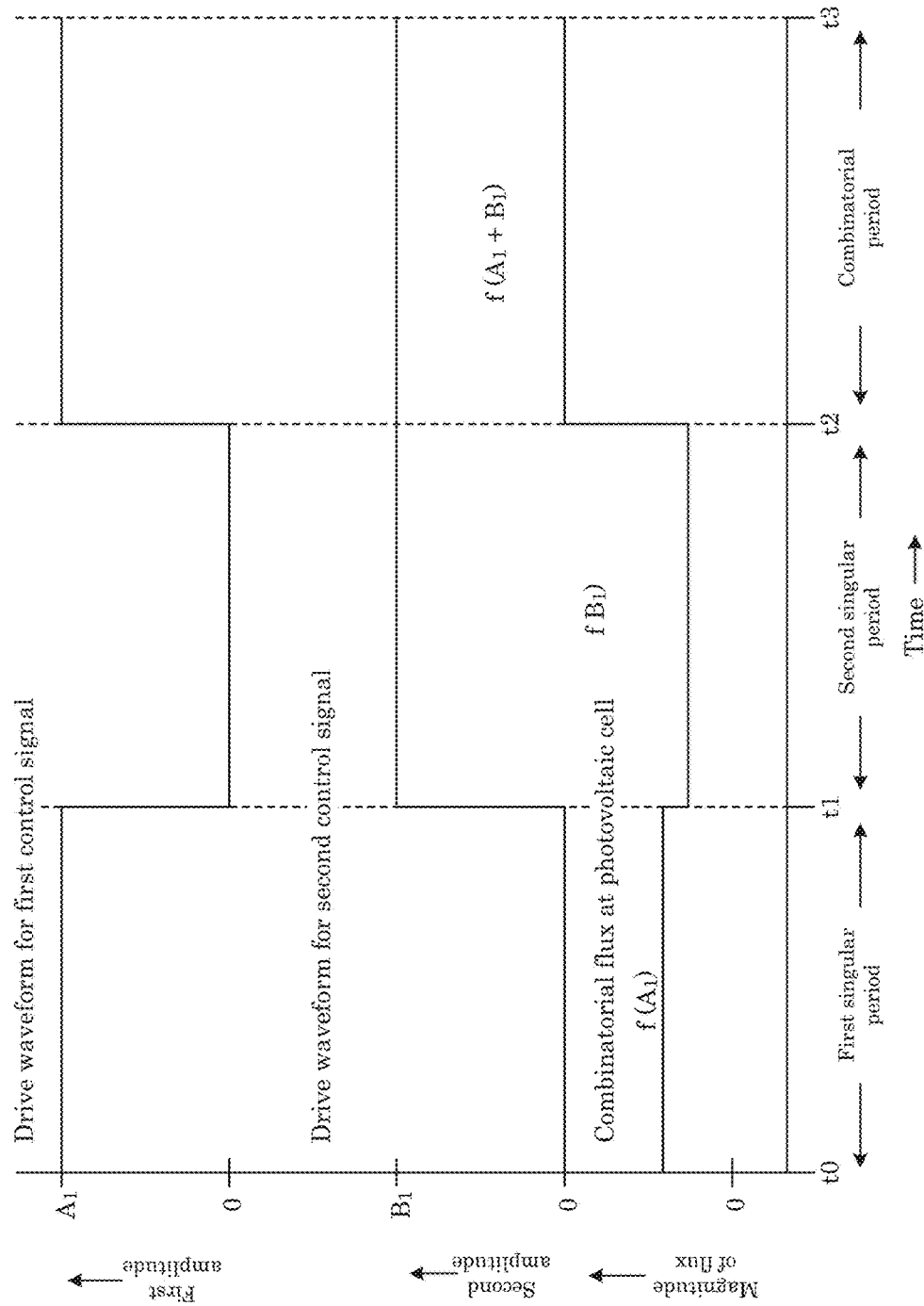
FIG. 15 shows a graph of a drive waveform for a first control signal, a drive waveform for a second control signal, and a combinatorial flux at a photovoltaic cell.
Figure 16:
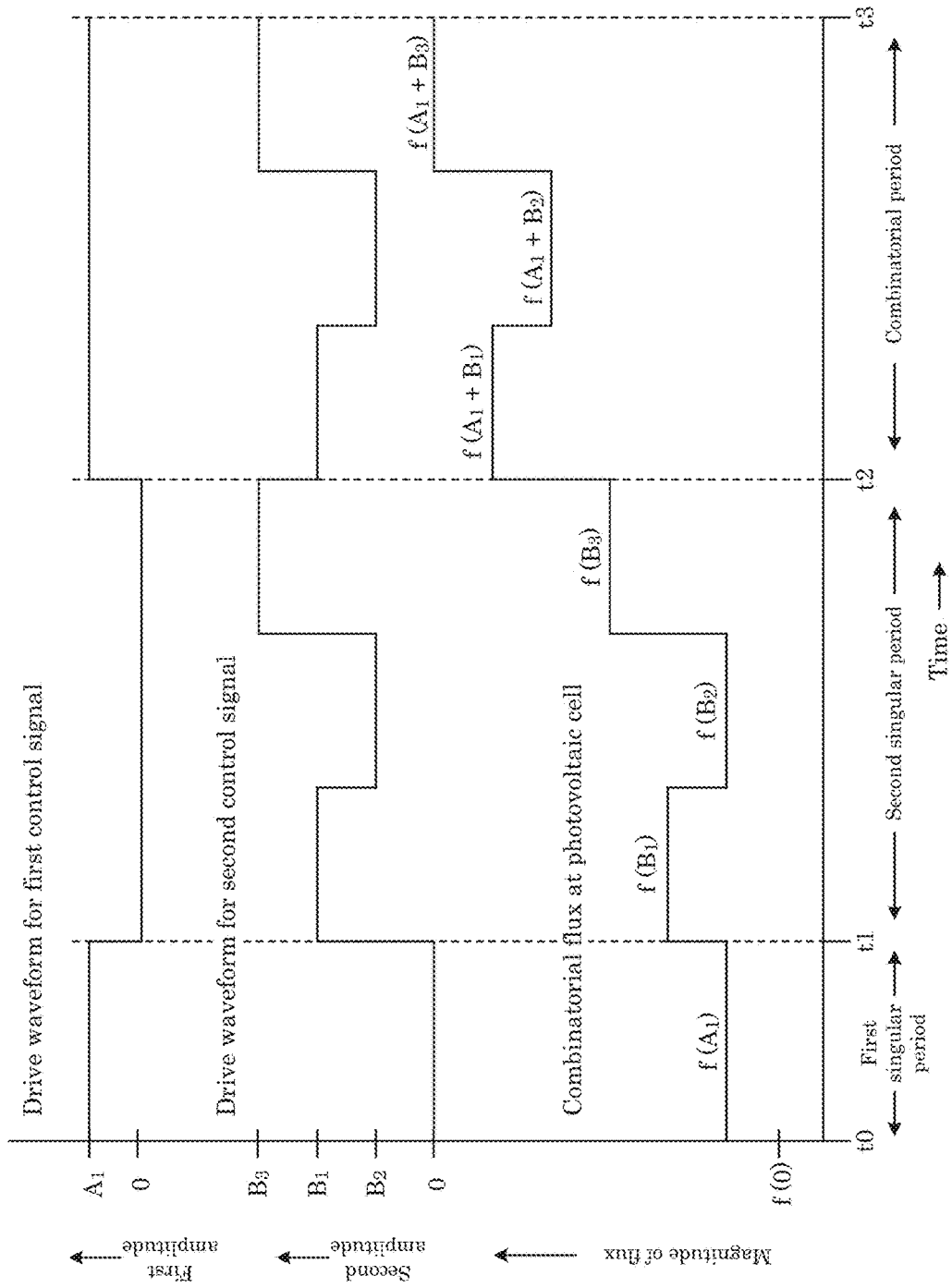
FIG. 16 shows a graph of a drive waveform for a first control signal, a drive waveform for a second control signal, and a combinatorial flux at a photovoltaic cell.

In an embodiment, combinatorial flux adder 100 produces pulses of first light 108, second light 110, and combinatorial light 124 as shown in FIG. 7, FIG. 8, FIG. 9, FIG. 10, FIG. 11, FIG. 12, FIG. 13, and FIG. 14, also referred to as AC mode. According to an embodiment, combinatorial flux adder 100 produces substantially constant flux (with respect to time) of first light 108, second light 110, and combinatorial light 124 as shown in FIG. 15 and FIG. 16, also referred to as DC mode.

In an embodiment, a process for determining a nonlinear response of a photovoltaic cell includes partitioning the nonlinearity region of interest into multiple signal intervals and performing combinatorial flux addition at different overlapping local levels. Each level can have a unique table of singular currents. A lower level of signals also can be accomplished with a table of supplied LED currents combined with disposition of a neutral density filter interposed between, e.g., each LED lamp and photovoltaic cell 112. The local intervals can be combined, i.e., stitched together, to form a global curve. According to an embodiment, an automated measurement time for 75 averaged signals was about 20 minutes, which included wait times after LED current changed for stability and 100 measurements at each signal level for calculation of mean values of the signal 132.

In an embodiment, a mathematical framework for combinatorial flux addition provides a relationship between signal 132 and flux (120, 122, 126) as well as a scaled solution thereof. The system of linear equations constructed from combinatorial measurements is overdetermined because a total number of unknowns (i.e., fluxes and coefficients in the system of equations) is smaller than a total number of equations. For example, in some of the algorithmic processes herein, a total unknown fluxes was 30 with 5 or fewer unknown polynomial coefficients, and a total number of equations was 75 (=15+15+45).

According to an embodiment, in unscaled solution of the system of linear equations, an Nth-degree polynomial model for flux $\varphi$ (e.g., in W/m²) as a function of short-circuit current signal s (e.g., in A DC) is $$0 = g(s) = r_0 + r_1 s + r_2 s^2 + \ldots + r_N s^N \quad (1).$$

Let $(\varphi_{Ak})$, k=1, . . . , $K_A$ denote a list of KA distinct fluxes from LED lamp A, and let $(\varphi_{Bk})$, k=1, . . . , $K_B$, denote a list of KB distinct fluxes from LED, lamp B, wherein LED lamp A is first light emitter 104, and LED lamp B is second light emitter 106. Let $(\varphi_{Ai_m} + \varphi_{Bj_m})$, for m=1, M, denotes a list of M distinct combinations of the fluxes from lamp A and lamp B, where $i_m \in \{1, \ldots K_A\}$ and $j_m \in \{1, \ldots, K_B\}$. Let $s_{Ai_m}$ denote the signal (i.e., photovoltaic output 132) measured for lamp A at flux setting $\varphi_{Ai_m}$ and $s_{Bj_m}$ denote the signal (i.e., photovoltaic output 132) measured for lamp B at flux setting $\varphi_{Bj_m}$. Let $s_{Ai_m + Bj_m}$ denote the signal measured for lamp A and lamp B with total flux $\varphi_{Ai_m + Bj_m} = \varphi_{Ai_m} + \varphi_{Bj_m}$, because flux addition is linear. Both signals and fluxes are strictly positive. Assuming that no measurements are repeated, the individual and combined measurements of lamp A and lamp B give the following linear system of KA+KB+M equations:

$$\begin{cases} 0 = r_0 + r_1 s_{A_1} + \ldots + r_N s_{A_1}^N - \phi_{A_1}, \\ \vdots \\ 0 = r_0 + r_1 s_{A_{K_A}} + \ldots + r_N s_{A_{K_A}}^N - \phi_{A_{K_A}}, \end{cases} K_A \text{ eq's}$$
$$\begin{cases} 0 = r_0 + r_1 s_{B_1} + \ldots + r_N s_{B_1}^N - \phi_{B_1}, \\ \vdots \\ 0 = r_0 + r_1 s_{B_{K_B}} + \ldots + r_N s_{B_{K_B}}^N - \phi_{B_{K_B}}, \end{cases} K_B \text{ eq's}$$
$$\begin{cases} 0 = r_0 + r_1 s_{A_{i_1} + B_{j_1}} + \ldots + r_N s_{A_{i_1} + B_{j_1}}^N - \phi_{A_{i_1}} - \phi_{B_{j_1}}, \\ \vdots \\ 0 = r_0 + r_1 s_{A_{i_M} + B_{j_M}} + \ldots + r_N s_{A_{i_M} + B_{j_M}}^N - \phi_{A_{i_M}} - \phi_{B_{j_M}} \end{cases} M \text{ eq's}$$

(2)

with unknown coefficients $r_n$ for n=0, . . . , N, and unknown fluxes $\varphi_{A_k}$ for, for k=1, . . . , KA, and $\varphi_{B_k}$, for k=1, . . . , KB. By inspection, a solution to system (2) is the trivial zero solution, which is not physically reasonable. A non-trivial physical solution to the system will not be unique, because a positive rescaling of the unknowns will also be a solution. As used herein, "solution" in the overdetermined case refers to a standard linear-least-squares solution, which must have a zero sum of squared residuals because the zero solution has a zero sum of squared residuals. Thus, the problem is ill-posed because either (1) a physically relevant solution does not exist, or (2) if a physically relevant solution exists, then it is not unique.

The problem is well-posed by assuming that $r_1 \neq 0$. This assumption implies that the flux versus signal relationship has a significant linear component. Dividing through by $r_1 \neq 0$ gives a related linear system, i.e., $$\begin{cases} 0 = r_0^* + s_{A_1} + \ldots + r_N^* s_{A_1}^N - \phi_{A_1}^*, \\ \vdots \\ 0 = r_0^* + s_{A_{K_A}} + \ldots + r_N^* s_{A_{K_A}}^N - \phi_{A_{K_A}}^*, \\ 0 = r_0^* + s_{B_1} + \ldots + r_N^* s_{B_1}^N - \phi_{B_1}^*, \\ \vdots \\ 0 = r_0^* + s_{B_{K_B}} + \ldots + r_N^* s_{B_{K_B}}^N - \phi_{B_{K_B}}^*, \\ 0 = r_0^* + s_{A_{i_1} + B_{j_1}} + \ldots + r_N^* s_{A_{i_1} + B_{j_1}}^N - \phi_{A_{i_1}}^* - \phi_{B_{j_1}}^*, \\ \vdots \\ 0 = r_0^* + s_{A_{i_M} + B_{j_M}} + \ldots + r_N^* s_{A_{i_M} + B_{j_M}}^N - \phi_{A_{i_M}}^* - \phi_{B_{j_M}}^*, \end{cases}$$

(3)

$r_0^* = r_0/r_1$, $\varphi_{A_1}^* = \varphi A_1/r_1$, wherein, etc. Here, M≥N in order to avoid an underdetermined system. This system can be solved by linear least squares to give coefficients and fluxes up to an undetermined linear scale factor r1. Alternatively, the system of equations above can be rearranged and placed into matrix-vector form:

$$U \cdot \Phi = s \quad (4)$$

wherein the flux vector $\Phi$ is composed of first the singular fluxes (from LED A and LED B), then the combination fluxes, and then the coefficients $r_0^*$, $r_2^*$, etc. at the very end. The signal vector s, is composed of the singular and combination signals in the same manner as the fluxes. Written in expanded form, the matrix equation looks as follows:

$$\begin{bmatrix} 1 & 0 & 0 & \ldots & 0 & 0 & 0 & \ldots & -1 & -s_{A_1}^2 & \ldots & -s_{A_1}^N \\ 0 & 1 & 0 & \ldots & 0 & 0 & 0 & \ldots & -1 & -s_{A_2}^2 & \ldots & -s_{A_2}^N \\ \vdots & \vdots & \vdots & \vdots & \vdots & \vdots & \vdots & \vdots & \vdots & \vdots & & \vdots \\ 0 & 0 & 0 & \ldots & 1 & 0 & 0 & \ldots & -1 & -s_{B_1}^2 & \ldots & -s_{B_1}^N \\ 0 & 0 & 0 & \ldots & 0 & 1 & 0 & \ldots & -1 & -s_{B_2}^2 & \ldots & -s_{B_2}^N \\ \vdots & \vdots & \vdots & \vdots & \vdots & \vdots & \vdots & \vdots & \vdots & \vdots & & \vdots \\ 1 & 0 & 0 & \ldots & 1 & 0 & 0 & \ldots & -1 & -s_{A_1+B_1}^2 & \ldots & -s_{A_1+B_1}^N \\ 1 & 0 & 0 & \ldots & 0 & 1 & 0 & \ldots & -1 & -s_{A_1+B_2}^2 & \ldots & -s_{A_1+B_2}^N \\ 1 & 0 & 0 & \ldots & 0 & 0 & 1 & \ldots & -1 & -s_{A_1+B_3}^2 & \ldots & -s_{A_1+B_3}^N \\ 0 & 1 & 0 & \ldots & 0 & 1 & 0 & \ldots & -1 & -s_{A_2+B_2}^2 & \ldots & -s_{A_2+B_2}^N \\ \vdots & \vdots & \vdots & \vdots & \vdots & \vdots & \vdots & \vdots & \vdots & \vdots & & \vdots \end{bmatrix} \quad (5)$$

$$\begin{bmatrix} \phi_{A_1}^* \\ \phi_{A_2}^* \\ \vdots \\ \phi_{B_1}^* \\ \phi_{B_2}^* \\ \vdots \\ \phi_{A_1}^* + \phi_{B_1}^* \\ \phi_{A_1}^* + \phi_{B_2}^* \\ \phi_{A_1}^* + \phi_{B_3}^* \\ \phi_{A_2}^* + \phi_{B_2}^* \\ \vdots \\ r_0^* \\ \vdots \\ r_N^* \end{bmatrix} = \begin{bmatrix} s_{A_1} \\ s_{A_2} \\ \vdots \\ s_{B_1} \\ s_{B_2} \\ \vdots \\ s_{A_1+B_1} \\ s_{A_1+B_2} \\ s_{A_1+B_3} \\ s_{A_2+B_2} \\ \vdots \end{bmatrix}$$

The large matrix on the left is the U matrix, where rows 1, . . . , KA+KB are related to the singular flux measurements, and rows 1+KA+KB, . . . , M are related to combinatorial fluxes. The linear least squares solution for the fluxes and the coefficients is given by:

$$\Phi = [(U^T \cdot U)^{-1} \cdot U^T] s \quad (6)$$

wherein symbols T and −1 stand for transpose and inverse of their respective matrices. The analysis is first performed for a linear relationship, i.e., up to the $r_0^*$ coefficient. The residuals of the fit are then considered to determine if this was an adequate fit of the data. The residuals are a comparison between the calculated flux from the regression and the interpolation of the flux from the corresponding signal. The residual for a given combinatorial data point up to the linear term is defined as:

$$(\varphi_{A i_m}^* + \varphi_{B j_m}^*) - (r_0^* + s_{A i_m + B j_m}) \quad (7)$$

A residual value can also be defined for a singular flux/signal data point as well. If the calculated residuals are too large or show a skewed pattern or relationship, then the next higher order of regression is performed, i.e., up to $r_2^*$. This approach means that a column of $-s^2$ values is added to the last column of the U matrix. Again, the residuals are analyzed to determine the goodness of the fit. This process can be repeated through $r_N^*$ where we have found that generally $N=4$ suffices even for the most nonlinear cases.

In an embodiment, a scaled solution is produced. The calculation discussed so far determines the relationship between the signals measured and the incident fluxes over a given range; however, the solution remains unscaled. Here, a scaled relationship is produced, i.e., the irradiance spectral responsivity plotted as a function of current, if one or more calibrated flux values were known. Flux calibration can be achieved by the use of a reference photodetector with known spectral irradiance response. For a plurality of calibrated fluxes $\varphi_{C_k}=1, \ldots, K_C$ with a corresponding list of measured signals $(s_{C_k})$, the undetermined linear scale factor $r_1$ are determined. Using the coefficients $r_0^*, r_2^*, \ldots, r_N^*$ from the linear least square fit with the calibrated points gives the linear system:

$$\begin{cases} 0 = r_1(r_0^* + s_{C_1} + \ldots + r_N^* s_{C_1}^N) - \phi_{C_1}, \\ \vdots \\ 0 = r_1(r_0^* + s_{C_{K_C}} + \ldots + r_N^* s_{C_{K_C}}^N) - \phi_{C_{K_C}}, \end{cases} \quad (8)$$

which is solved for $r_1$. Here, the calibrated signals lie in the same domain as the signals used to fit the polynomial model (1). System (8) has full rank and solved by linear least squares if $K_C \geq 2$. Finally, the scaled coefficients are given by $r_N = r_1 r_N^*$, $N \neq 1$, and the fluxes are given by $\varphi_{A_k} = r_1 \varphi_{A_k}^*$ and $\varphi_{B_k} = r_1 \varphi_{B_k}^*$.

In an embodiment, a continuous solution from separate fits on multiple overlapping intervals of signal values is provided. As mentioned previously, if s/φ vs. s is desired over a large s range, then the combinatorial method is performed multiple times over a given signal interval. Sometimes, multiple polynomials are used to achieve good fits on different signal intervals, e.g., across multiple decades of signal. If these intervals are ordered with overlaps between them, the algorithm can continuously piece together the unscaled local polynomial curve fits on each interval and simultaneously scale the global continuous fit to a list of calibrated fluxes with corresponding measured signals that lie in the overall range of measured signals.

A process to stitch these separate curves together includes letting $[s_{min,p}, s_{max,p}]$ denote the interval of definition of the pth polynomial curve fit of P ordered polynomial curve fits. For ease of notation, let N be the largest degree among all the local polynomial fits, letting any additional coefficients be zero where necessary. Each of the P unscaled fit curves has one unknown scalar, giving the following P possible functions for φ:

$$\phi = g_1(s) = r_{11}(r_{01}^* + s + r_{21}^* s^2 + \ldots + r_{N1}^* s^N) \quad (9)$$

for $s \in [s_{min,1}, s_{max,1}]$, $$\vdots$$

$$\phi = g_P(s) = r_{1P}(r_{0P}^* + s + r_{2P}^* s^2 + \ldots + r_{NP}^* s^N)$$

for $s \in [s_{min,P}, s_{max,P}]$, with unknown scalars $r_{11}, \ldots r_{1P}$ that must be determined.

The process also includes, for each of the P−1 overlap regions for the P unscaled fit curves, determining a midpoint signal of the overlap; and defining the knot signal between curves p and P+1 as:

$$s_p^* = \frac{s_{max,p} + s_{min,p+1}}{2}, \quad p = 1, \ldots, P-1. \quad (10)$$

Knot selections other than the average value can be made, but with sufficient interval overlaps the simple choice of these middle values can reduce interval edge effects that can occur in a polynomial fit.

The interval ordering and overlap aspects include $s_{min,p+1} \leq s_{max,p}$ for all so that each knot signal is contained in both intervals from which it is constructed. This arrangement provides a partition of new intervals listed in order by $$([s_{min,1}, s_1^*], [s_1^*, s_2^*], \ldots, [s_{P-1}^*, s_{max,P}]) \quad (11)$$

Continuity of flux between any two adjacent segmented curves gives the following system of P−1 linear equality constraints for the knot fluxes in the P unknown scalars $r_{11}, \ldots, r_{1P}$:

$$\begin{cases} r_{11}(r_{01}^* + s_1^* + \ldots + r_{N1}^* s_1^*) = r_{12}(r_{02}^* + s_1^* + \ldots + r_{N2}^* s_1^*), \\ \vdots \\ r_{1P-1}(r_{0P-1}^* + s_{P-1}^* + \ldots + r_{NP-1}^* s_{P-1}^*) = r_{1P}(r_{0P}^* + s_{P-1}^* + \ldots + r_{NP}^* s_{P-1}^*), \end{cases} \quad (12)$$

where all the polynomial coefficients and knot signals are known values.

Given the partition (11), the process includes assigning each calibrated flux with a corresponding measured signal to exactly one of the intervals. The scaled polynomial fit corresponding to each interval is evaluated at the measured signal(s) in that interval and set to equal the respective calibrated flux(es). For example, on the $p^{th}$ interval, $K_{C_p}$ calibrated fluxes $$\phi_{C_{P_1}}, \ldots, \phi_{C_{pK_{C_p}}}$$

correspond to $K_{C_p}$ measured signals $$s_{C_{P_1}}, \ldots, s_{C_{pK_{C_p}}}.$$

Furthermore, a calibration point can be used so that some curve intervals may not have any points associated with them because of the continuity of the relationship between signals and fluxes. This gives a linear system of the following form to solve for $r_{11}, \ldots, r_{1P}$:

$$\begin{cases} 0 = r_{11}(r_{01}^* + s_{C1_1} + \ldots + r_{N1}^* s_{C1_1}^N) - \phi_{C1_1}, \\ \vdots \\ 0 = r_{11}(r_{01}^* + s_{C1_{KC1}} + \ldots + r_{N1}^* s_{C1_{KC1}}^N) - \phi_{C1_{KC1}}, \\ \vdots \\ 0 = r_{1P}(r_{0P}^* + s_{CP_1} + \ldots + r_{NP}^* s_{CP_1}^N) - \phi_{CP_1}, \\ \vdots \\ 0 = r_{1P}(r_{0P}^* + s_{CP_{KCP}} + \ldots + r_{NP}^* s_{CP_1}^N) - \phi_{CP_{KCP}}, \end{cases} \quad (13)$$

$\}$ 1st curve interval $\}$ $p^{th}$ curve interval subject to the linear equality constraints (12).

System (13) with linear equality constraints (12) can be solved readily using a linear equation solver program. If the optimization is not constrained to nonzero unknowns $r_{11}, \ldots, r_{1P}$, then one can verify the nonzero assumption after a solution is found. Additionally, if a calibration point is not available, the unsealed solutions can be stitched together to form a global unsealed solution in a presence of an overlap signal interval between the local curves. This can be accomplished by normalizing a single local curve, say, the $P^{th}$ curve interval and following the procedure above to stitch the remaining P−1 curves sequentially.

Combinatorial flux adder 100 has numerous beneficially and advantageous properties. First, the exact functional relationship between the signal and the incident flux is determined, without the need for a calibrated detector. Second, if a calibrated detector is available, then the relative flux values can be converted to absolute flux values with proper physical units. Third, wavelength dependence of the nonlinear relationship can be determined by use of light emitters of various wavelength. Finally, if the output of a photovoltaic cell is known at a certain flux irradiance and the nonlinearity relationship has also been determined using the flux adder 100, then the output of the photovoltaic cell at a different flux irradiance level can be calculated. Surprisingly, the nonlinear relationship between flux and signal is dependent upon the wavelength of illumination. Certain reference solar cells used for irradiance monitoring and measurements are nonlinear with irradiance. The nonlinearity of the reference solar cell can introduce an error in a measurement based on the reference solar cell.

Beneficially, combinatorial flux adder 100 provides combinatorial flux addition to determine the nonlinear relationship in solar cells between the output current of the cell and the incident irradiance level. In an embodiment, the magnitude of the light flux is controlled by the supplied currents to two LEDs (or two sets of them) in a combinatorial fashion. The signals measured from the cell are arranged within a related overdetermined linear system of equations derived from an appropriately chosen Nth degree polynomial representing the relationship between the measured signals and the incident fluxes. The flux values and the polynomial coefficients are then solved for by linear least squares to obtain the best fit. The technique can be applied to any solar cell, under either monochromatic or broadband spectrum. For the unscaled solution, no reference detectors or prior calibrations of the light flux are required. However, if at least one calibrated irradiance value is known, then the entire curve can be scaled to an appropriate spectral responsivity value. Combinatorial flux adder 100 acquires a large number of data points in a relatively short period over a large signal range.

The articles and processes herein are illustrated further by the following Examples, which are non-limiting.

EXAMPLES

Example 1. Combinatorial Flux Adder

A combinatorial flux adder was constructed by choosing and installing two LED light emitters 104 and 106 that were electrically connected to a LED current driver 102. LED Light emitters 104 and 106 were oriented in such a way as to fully illuminate the photovoltaic cell 112, for both the singular or combinatorial measurements. Furthermore, LED driver 102 was electronically triggered by signal generator 134 by way of signal 136. The photovoltaic cell 112 which was set up to receive fluxes 120, 122 and 126 was electrically connected to a transimpedance amplifier 140. Amplifier 140 was connected so that its output signal 131 was received by detector 118. Detector 118 which was a lock-in amplifier also received a trigger signal 138 from signal generator 134. The output of detector 118, that is signal 146 was recorded and analyzed by analyzer 144, a computer. That connection was made by a cable suitable for digital signal transfers.

The combinatorial flux adder was used to measure and analyze the nonlinear relation between incident flux irradiance and the short circuit current output in five different types of Si-based solar cells and detectors. Two kinds of LED lamps were used, namely two 627 nm LEDs and two 890 nm LEDs. Furthermore, the results of these measurements were compared with the light-bias dependent spectral response measurements in overfilled (irradiance) mode. In order for the comparison to be as similar as possible, both the pulsed monochromatic light and the DC bias light were of the same kind. The cells tested were as follows: Cell#1 a KG-5 filtered monocrystalline Si cell, Cell#2 a polycrystalline Si cell, Cell#3 a regular monocrystalline Si cell, Cell#4 a second KG-5 filtered Si cell, and Cell#5 a NIST working standard Si photodetector. Cells #1 to #4 were 2 cm×2 cm World Photovoltaic Scale (WPVS)-designed reference cells, and Cell #5 was a 1 cm-diameter silicon detector.

Figure 17:
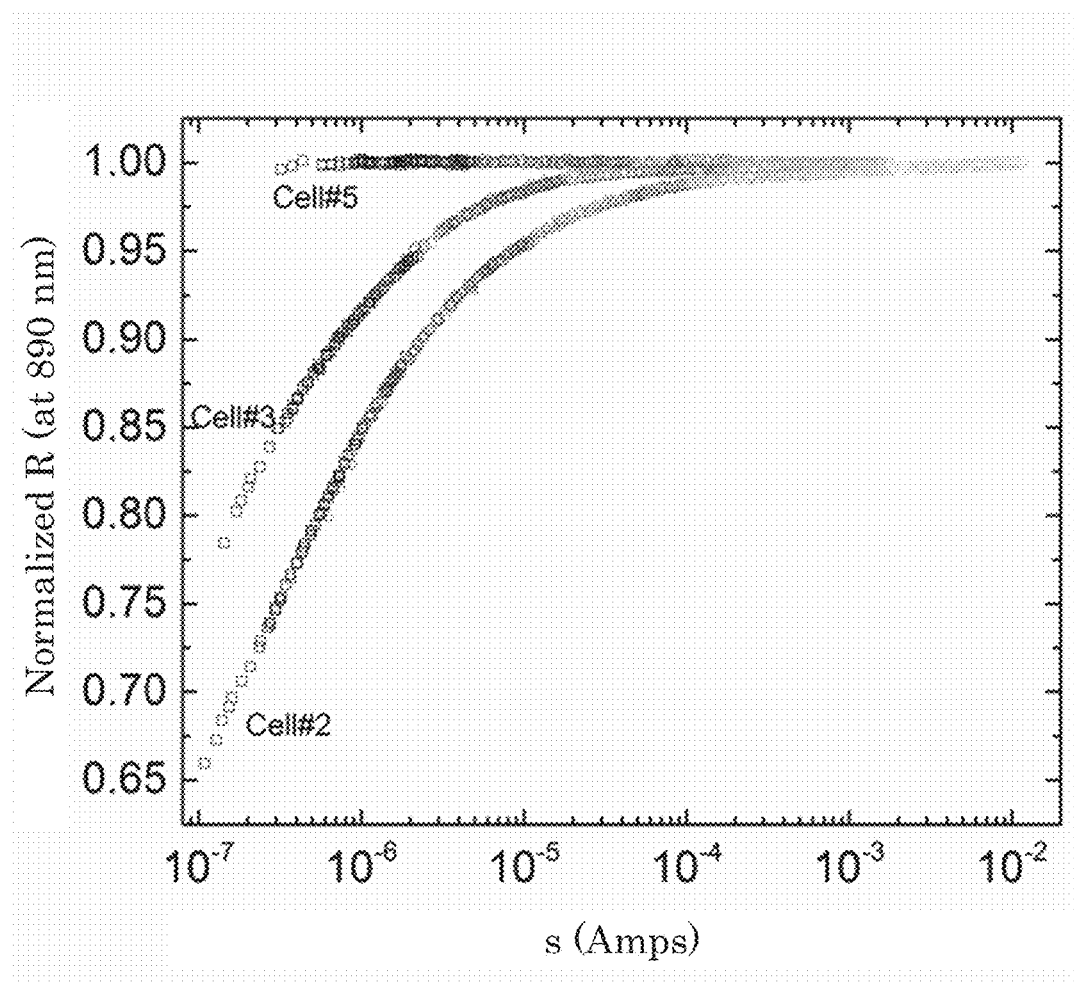
FIG. 17 shows a graph of a normalized ratio of signal to flux versus signal.

FIG. 17 shows normalized global unscaled measurement of $R=s/\varphi$ versus s over roughly 5 orders of magnitude at 890 nm for three of the cells. That is, for every signal value, a flux is calculated and the ratio R is plotted vs. s. For the ease of comparison, each global curve was normalized to 1 at the highest R so that the differences between curves at each s level can be shown more clearly. The different-colored segments correspond to the different intervals of signals in which the measurement and regression analysis were performed. The individual local segments, each consisting of 75 total data points, were stitched together using the method of section 3C. It can be seen that Cell#5 is completely linear over this signal range because the ratio R remains constant over all s, whereas the other two cells show some level of nonlinearity in the signal range below 1 mA, reaching a linear behavior at higher values. Cell#2, for example, shows a dramatic 20% lower responsivity at the signal level of 100 nA compared to 1 µA but only 10% nonlinearity between 1 µA to 10 µA, followed by less than 5% change between 10 µA and 1 mA. Since R, which is related to the spectral responsivity of the cell, remains constant at signal values greater than ~1 mA, this result implies that the total AM 1.5-weighted $I_{sc}$ of the device is also linear with intensity at signal levels above this value. This is because the 890 nm wavelength of the LED light is close to the peak responsivity of silicon solar cells. Furthermore, the results of the measurement for these 3 cells imply that: 1. Cell#5 requires no light bias source when performing spectral response or quantum efficiency (QE) measurements, 2. For Cells#2, and #3, it is sufficient to use only a small enough light bias source that produces at least 1 mA of DC current for QE measurements, even if QE of the cell under 1-sun conditions are desired. For these two cells, since the $I_{sc}$ under AM 1.5G is ~100 mA, the light bias intensity needed in order for the QE measurement to be valid at SRC conditions is only on the order of 1% of this total signal value. The bias light spectral composition can be light with energy close to the bandgap of the material, i.e., ≈900 nm for Si, and can provide sufficiently uniform absorption throughout the material to push the cell into the linear regime.

Figure 18:
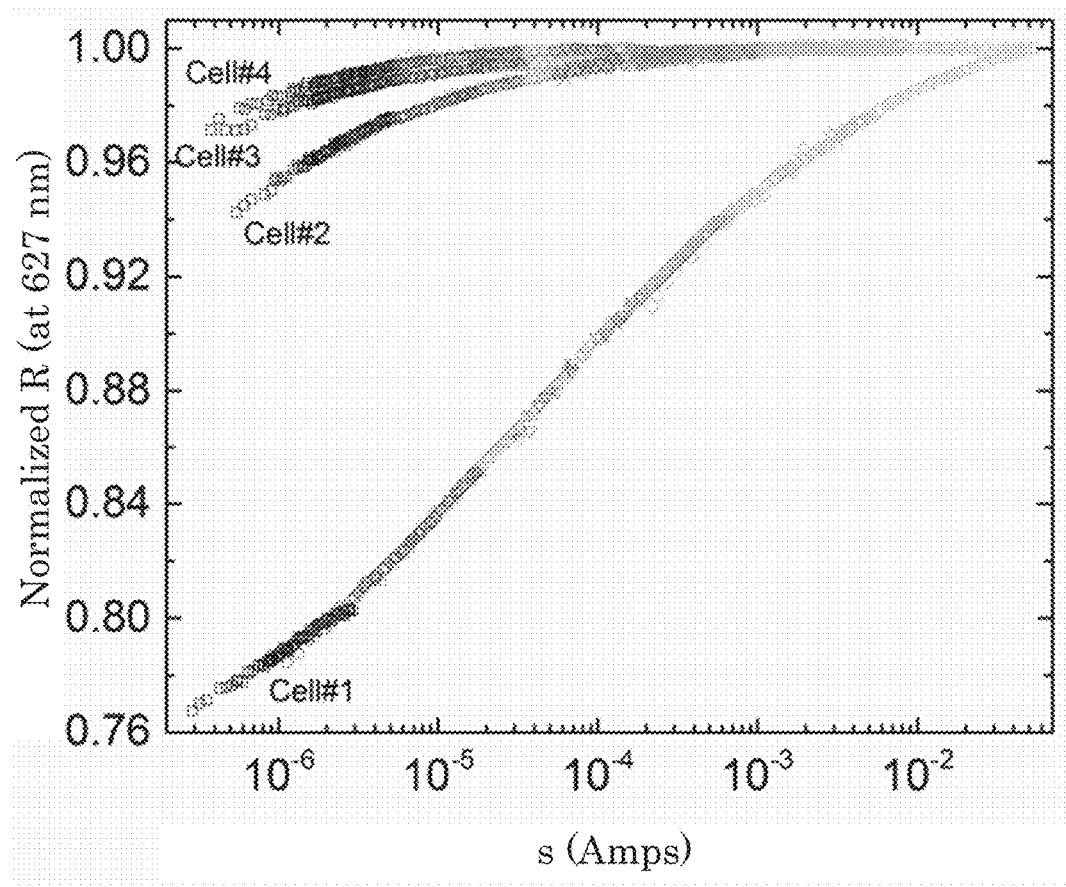
FIG. 18 shows a graph of a normalized ratio of signal to flux versus signal.

FIG. 18 shows the results of the unscaled nonlinearity measurements and analysis for Cell #1, #2, #3, and #4 at 627 nm. Cell#2, 3, and 4 show a similar trend to the measurements in FIG. 17 except that the total change in R over a similar range of s is much smaller than the 890 nm measurements. The behavior shown by Cell#1 (a KG-filtered, 2 cm×2 cm mono-Si reference cell) had a very strong nonlinear behavior that persisted to 50 mA of signal level (near the 1-Sun Isc for this device). Furthermore, at s levels above 1 Sun, the cell continues to show a non-constant R although it appears to be leveling off at higher s. This measurement indicates that for certain types of cells such as this one where the nonlinearity is prevalent even up to 1-Sun SRC conditions or higher, significant errors can occur if this cell is used for solar simulator light level setting at conditions even slightly below or above the intended SRC, unless of course this type of data is provided along with SRC calibrations so that corrections can be made. Also, QE measurements for AM 1.5 conditions must be performed with light bias levels nearly at 1-Sun conditions.

Figure 19:
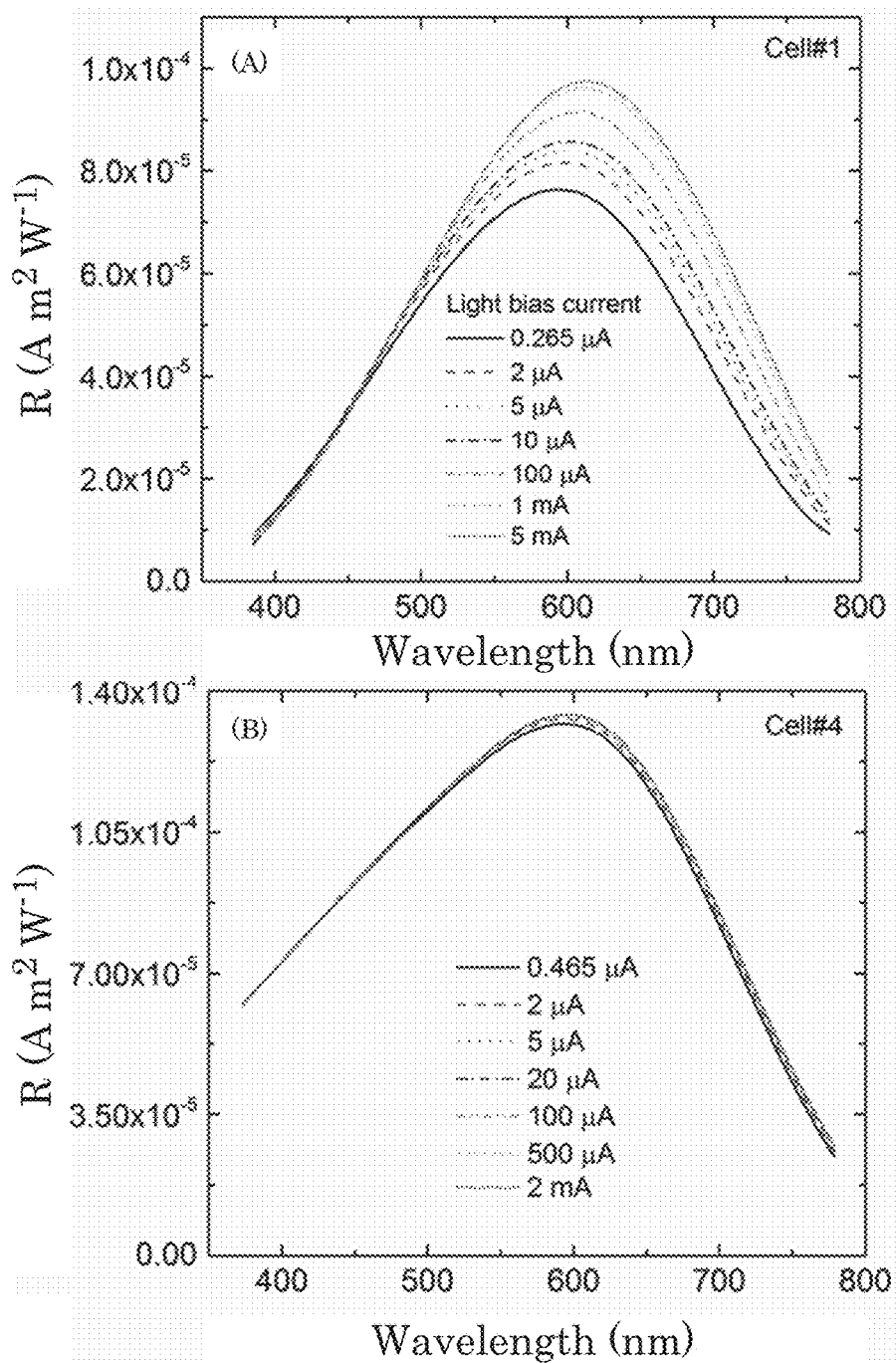
FIG. 19 shows graphs of a ratio of signal to flux versus versus wavelength.

To demonstrate this point more clearly, panel A of FIG. 19 shows a plot of the irradiance spectral responsivity of Cell#1 versus wavelength λ for several light bias currents (light bias source of white LEDs), revealing a significant bias dependence that is spectrally more severe in the red part of the spectrum, as reported elsewhere. The unit of R is the unit of s in amperes divided by the unit of flux intensity in W/m2. This measurement was performed using an LED-based integrating sphere, wherein the pulsed monochromatic probe light is maintained at very low flux levels while the bias light can be changed over the cell to achieve a given light-bias current level. The response of the cell in the near-IR is suppressed due to the KG5 window filter, but the results are consistent with the 627 nm combinatorial measurements for this cell in FIG. 18, in that the responsivity or the ratio R change as a function of the $I_{SC}$ signal. In contrast to these data, panel B of FIG. 19 shows the light bias dependence of the spectral responsivity for Cell #4 which is also a KG-filtered Si reference cell. This cell, however, shows only a very subtle change in R at low signal levels, even in the red/NIR range, demonstrating a good linear response as was also indicated in the 627 nm combinatorial measurements of FIG. 18.

The measurement results presented in FIG. 17 and FIG. 18 indicate that the combinatorial technique is a very useful tool to verify the linearity of solar cells, even before any other type of device characterization such as I-V measurements or spectral response measurements are performed on the cell.

Figure 20:
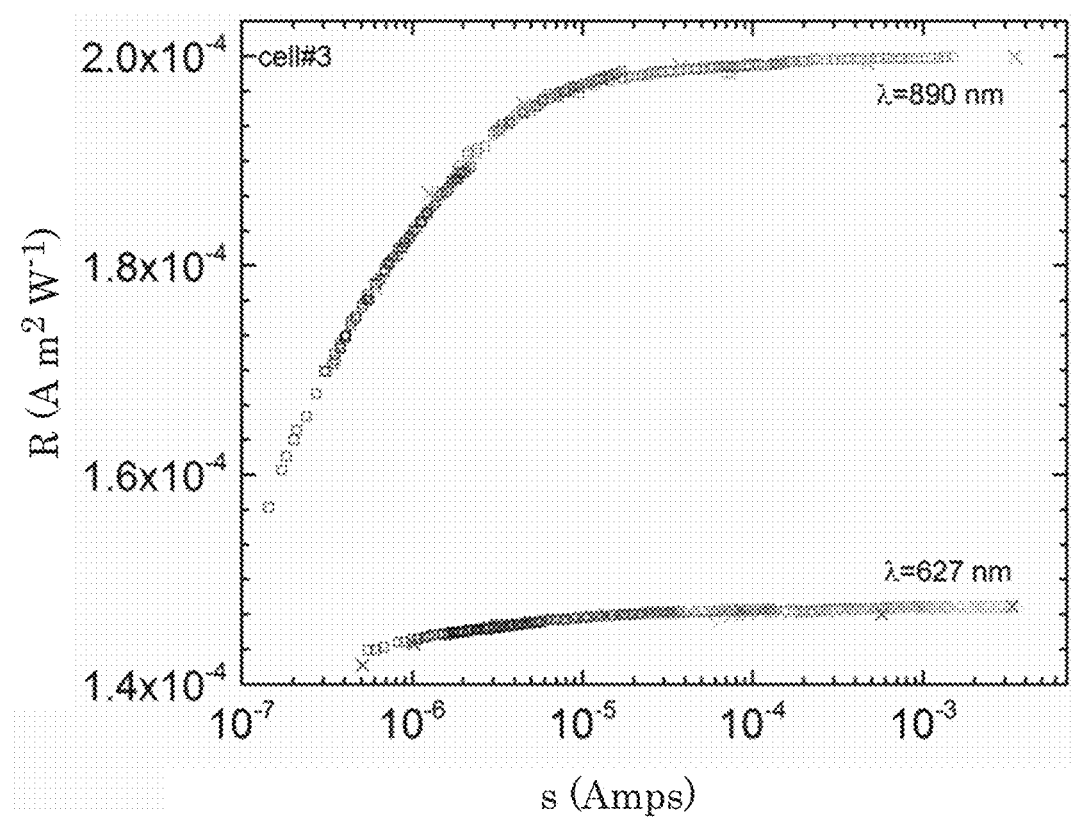
FIG. 20 shows a graph of a ratio of signal to flux versus signal.

FIG. 20 shows the scaled global R versus s measurements for Cell #3 at both the 890 nm and 627 nm wavelengths. The flux was measured using the standard working detector, Cell #5, which had previously been calibrated and whose linear behavior was verified over a large s range. In addition to using the calibrated flux measurements to scale the R versus s plots, irradiance spectral response measurements were made as a function of a few select light bias currents as shown by the cross data points. Excellent agreement was observed between the combinatorial technique and the spectral response measurements as indicated in FIG. 20.

Example 2. Determination of Deviation from Linearity

Figure 21:
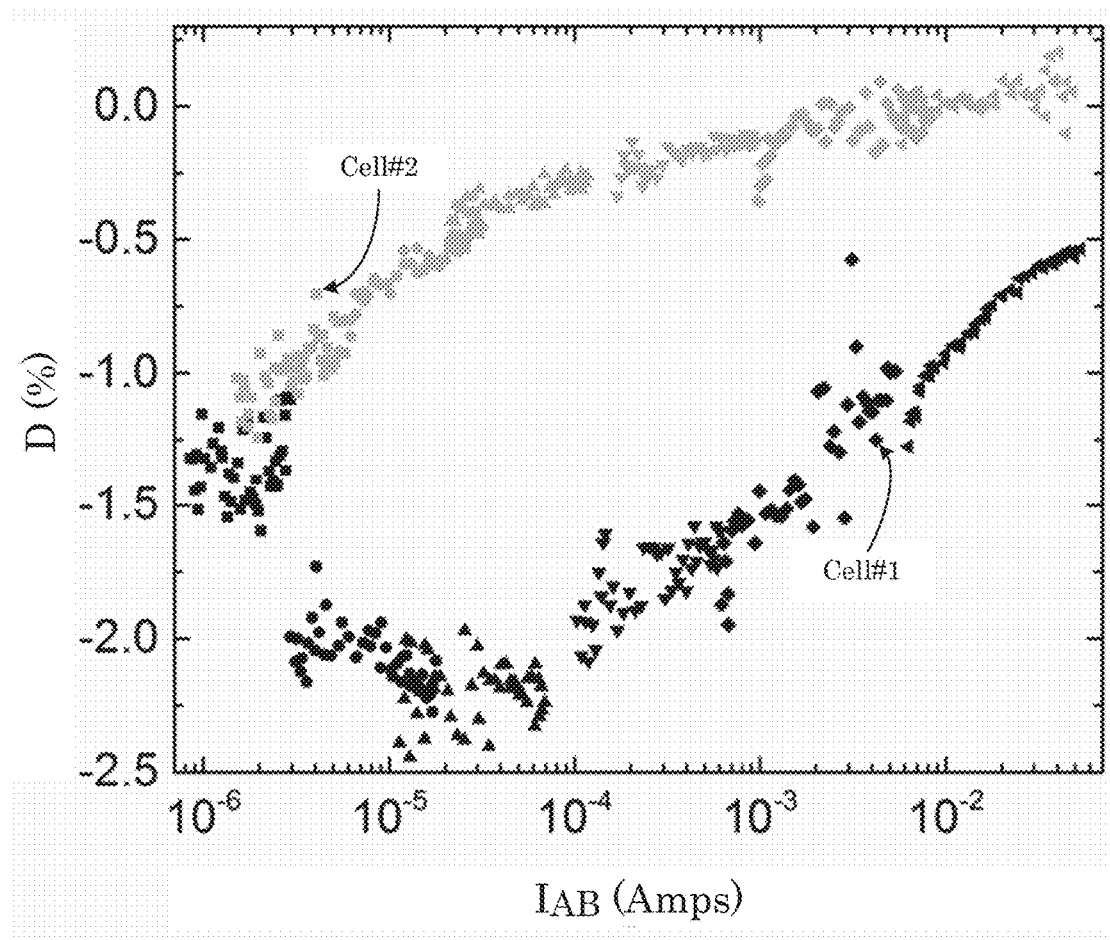
FIG. 21 shows a graph of a deviation parameter versus signal.

The combinatorial flux adder described in Example 1 was used to determine linearity by calculating parameter D that was a normalized percentage deviation from linearity:

$$D = 100 \times \frac{(s_A + s_B) - s_{AB}}{s_{AB}} \quad (14)$$

where $s_A$ or $s_B$ are the short circuit current signals from each lamp and $s_{AB}$ the short circuit current signal with both lamps irradiating the cell. This approach is often used by some researchers and examiners to check for nonlinearity in the photovoltaic devices they test. The discussion here shows that this approach is not a valid approach for studying nonlinear behavior in photovoltaic cells. In a perfectly linear device, D should be zero simply due to the superposition principle. If we analyze data in Example 1 using this method, for example for Cells #1 and #2 with the 627 nm LEDs, the results can be seen in FIG. 21 for D versus $s_{AB}$. Cell #1 which had shown a significant nonlinear signal response with flux when analyzed within the combinatorial method (and also light bias dependent spectral response measurement) had deviation from linearity of less than 2.5% over the given signal range and Cell #2 shows slightly less nonlinearity that is zero at higher signal levels.

Figure 22:
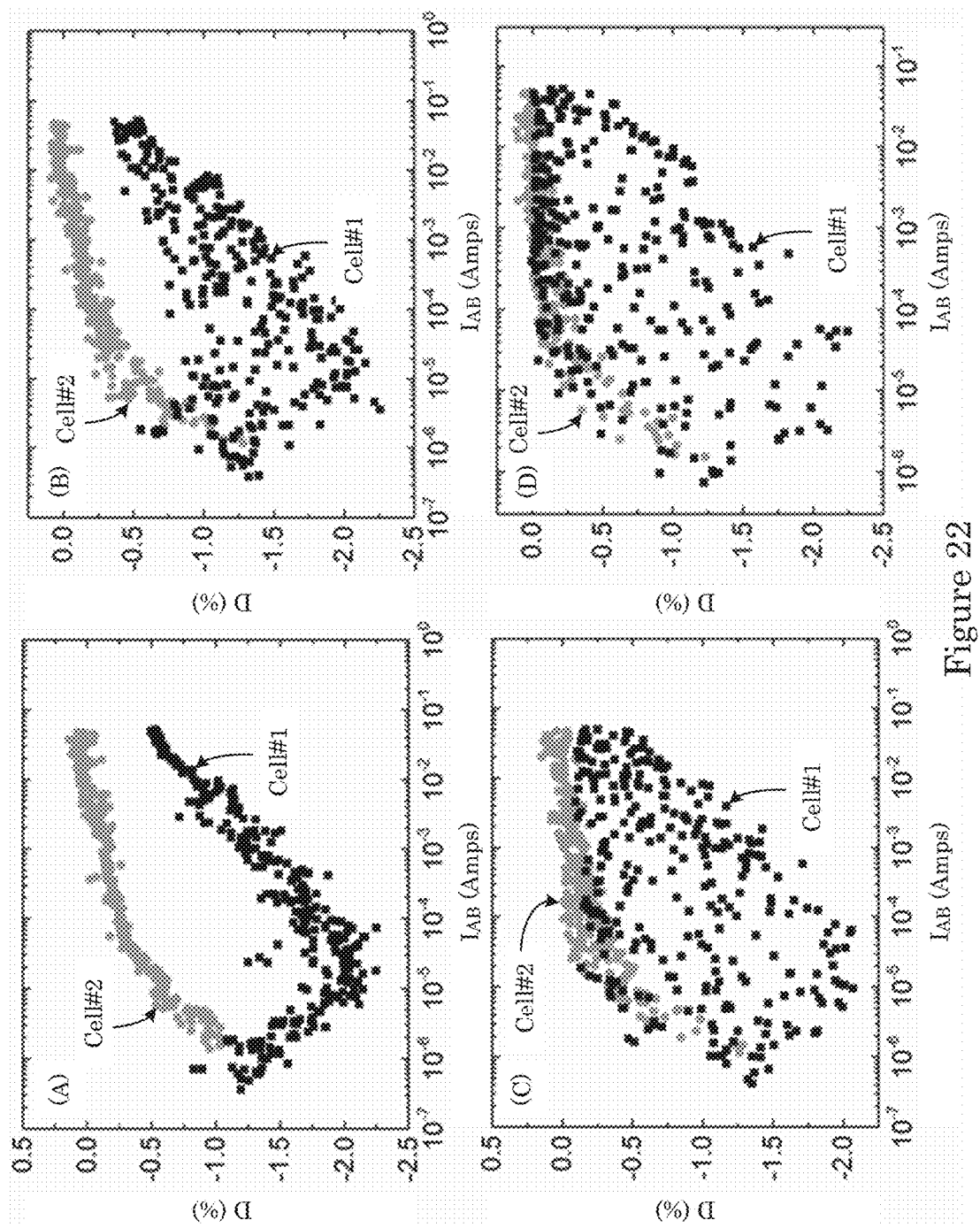
FIG. 22 show graphs of a deviation parameter versus signal.

The combinatorial flux adder provided the correct behavior of signal versus flux for true device nonlinear behavior. Here, a process for modeling data was as follows: given a particular s vs. φ relationship written in terms of ratio R, i.e., s=R(s)φ, two sets of randomly chosen signals $\{s_A\}$ and $\{s_B\}$ and their corresponding fluxes $\{\varphi_A\}$ and $\{\varphi_B\}$ were selected, and from $\{\varphi_A+\varphi_B=\varphi_{AB}\}$ and the function R(s), the corresponding $\{s_{AB}\}$ combined signals were calculated. These signals were then used to calculate the ratio parameter D and plot it as a function of $s_{AB}$. To make this analysis even more informative, the actual measured functional form of R for Cells#1 and 2 was used as shown in FIG. 18 by first obtaining an interpolating function based on these data and then using it in the above-mentioned calculation. FIG. 22 (panels A, B, C, and D) show the results of these calculations. In panel A of FIG. 22, the difference between any two randomly selected $s_A$ and $s_B$ signals are not greater than a factor of 3, but in panels B, C, and D of FIG. 22, this difference is allowed to increase up to 10, 100, and 1000 respectively. When the combinations are performed with signal values that are relatively closer together, i.e., panel A of FIG. 22, the results for D are tighter and in fact very closely matched with the experimental results of FIG. 21. However, as the spread between the signals increase, a larger spread in D is observed and panel D of FIG. 22 shows that a larger number of points are close to 0.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A combinatorial flux adder to determine a nonlinear response of a photovoltaic cell, the combinatorial flux adder comprising:
   a plurality of light emitters comprising:
      a first light emitter; and
      a second light emitter;
   the first light emitter to produce a first light comprising a first photon flux to irradiate the photovoltaic cell,
      wherein the first photon flux is produced in response to receipt, by the first light emitter, of a first control signal, wherein a first amplitude of the first control signal controls a first magnitude of the first photon flux;
   the second light emitter to produce a second light comprising a second photon flux to irradiate the photovoltaic cell, wherein the second photon flux is produced in response to receipt, by the second light emitter, of a second control signal, wherein a second amplitude of the second control signal controls a second magnitude of the second photon flux; and
a driver in electrical communication with the first light emitter and the second light emitter to provide:
the first control signal comprising the first amplitude to the first light emitter, and
the second control signal comprising the second amplitude to the second light emitter,
wherein the driver controls:
during a first singular period, the first light emitter to produce the first photon flux in an absence of the second photon flux from the second light emitter;
during a second singular period, the second light emitter to produce the second photon flux in an absence of the first photon flux from the first light emitter; and
during a combinatorial period:
the first light emitter to produce the first photon flux in combination with the second light emitter to produce the second photon flux to provide a first combinatorial flux that comprises the first photon flux and the second photon flux, and
the first light emitter to produce the first photon flux in combination with the second light emitter to produce the second photon flux to provide a second combinatorial flux that comprises the first photon flux and the second photon flux,
wherein the first combinatorial flux and the second combinatorial flux differ in at least one of the first photon flux or the second photon flux.

2. The combinatorial flux adder of claim 1, further comprising the photovoltaic cell to receive:
the first photon flux from the first light emitter during the first singular period,
the second photon flux from the second light emitter during the second singular period, and
the first combinatorial flux and the second combinatorial flux separately during the combinatorial period.

3. The combinatorial flux adder of claim 1, further comprising:
a detector to receive a photovoltaic output from the photovoltaic cell.

4. The combinatorial flux adder of claim 3, wherein the detector receives a drive waveform comprising a plurality of pulses corresponding to the first control signal and the second control signal.

5. The combinatorial flux adder of claim 4, further comprising:
a waveform generator to produce the drive waveform and in electrical communication with the detector.

6. The combinatorial flux adder of claim 5, wherein the waveform generator is in electrical communication with the driver.

7. The combinatorial flux adder of claim 6, wherein the detector comprises a phase sensitive detector that locks to the drive waveform and selectively detects the photovoltaic output based on the drive waveform.

8. The combinatorial flux adder of claim 1, wherein the plurality of light emitters comprises a light emitting diode, a flash lamp, a laser, an incandescent light, or a combination comprising at least one of the foregoing light emitters.

9. The combinatorial flux adder of claim 1, wherein light emitted by the plurality of light emitters comprises substantially identical wavelengths.

10. The combinatorial flux adder of claim 1, wherein the first light comprises a first wavelength,
the second light comprises a second wavelength, and
the first wavelength is different than the second wavelength.

11. The combinatorial flux adder of claim 1, wherein the first light and the second light do not spectrally overlap in wavelength.

12. The combinatorial flux adder of claim 1, wherein the first light and the second light spectrally overlap in wavelength.

13. The combinatorial flux adder of claim 1, further comprising:
an analyzer to determine a nonlinear relationship between:
the photovoltaic output of the photovoltaic cell produced in response to receipt of the first photon flux and the second photon flux, and
a magnitude of flux received by the photovoltaic cell from the first light and the second light that is converted into the photovoltaic output.

14. The combinatorial flux adder of claim 1, wherein the analyzer:
relates the photovoltaic output and the magnitude of flux in an overdetermined system of a plurality of linear equations, each linear equation comprising a polynomial equation as $f = \sum_{i=0}^{n} r_i s^i$, wherein f is the magnitude of the flux; i is an index of summation;
n is an order of the polynomial equation; r is a coefficient; and s is the photovoltaic output, and
solves the system of linear equations to determine the nonlinear relationship between the photovoltaic output and the magnitude of flux.

15. The combinatorial flux adder of claim 14, wherein the photovoltaic output of the photovoltaic cell is substantially nonlinear with respect to the magnitude of flux received by the photovoltaic cell from the plurality of light emitters.

16. A process for determining a nonlinear response of a photovoltaic cell, the process comprising:
producing a first set of first light pulses, the first light pulses comprising:
a first light comprising a first photon flux; and
a plurality of different first magnitudes of first photon flux;
producing a second set of second light pulses, the second light pulses comprising:
a second light comprising a second photon flux; and
a plurality of different second magnitudes of second photon flux;
repeating the first light pulses in a selected combination with the second light pulses to produce a combinatorial set of combinatorial light pulses, the combinatorial light pulses comprising:
a combinatorial light comprising a combinatorial photon flux; and
a plurality of different combinatorial magnitudes of combinatorial flux the selected combinations of the first light and the second light;
irradiating a photovoltaic cell with the first set in an absence of the second set and the combinatorial set;
irradiating the photovoltaic cell with the second set in an absence of the first set and the combinatorial set;
irradiating the photovoltaic cell with the combinatorial flux in an absence of the first set and the second set;

producing, by the photovoltaic cell, a first photovoltaic output in response to irradiating the photovoltaic cell with the first set in an absence of the second set and the combinatorial set;

producing, by the photovoltaic cell, a second photovoltaic output in response to irradiating the photovoltaic cell with the second set in an absence of the first set and the combinatorial set;

producing, by the photovoltaic cell, a combinatorial photovoltaic output in response to irradiating the photovoltaic cell with the combinatorial set in an absence of the first set and the second set;

relating a photovoltaic output and a magnitude of flux in an overdetermined system of a plurality of linear equations, each linear equation comprising a polynomial equation as $f = \sum_{i=0}^{n} r_i s^i$, wherein f is the magnitude of the flux; i is an index of summation; n is an order of the polynomial equation; r is a coefficient; s is the photovoltaic output; the photovoltaic output comprises the first photovoltaic output, the second photovoltaic output, and the combinatorial photovoltaic output; and the magnitude of flux comprises the first photon flux, the second photon flux, and the combinatorial photon flux; and solving the system of linear equations to determine the nonlinear relationship between the photovoltaic output and the magnitude of flux.

17. The process for determining a nonlinear response of a photovoltaic cell of claim 16, further comprising:

providing a first control signal, comprising a first drive waveform and a first amplitude, to a first light emitter to produce the first set of first light pulses by the first light emitter;

providing a second control signal, comprising a second drive waveform to a second light emitter to produce the second set of second light pulses by the second light emitter; and providing a combinatorial control signal comprising a third drive waveform and a fourth drive waveform to produce the combinatorial set of combinatorial light pulses, wherein the third drive waveform is provided to the first light emitter, and the fourth drive waveform is provided to the second like emitter.

18. The process for determining a nonlinear response of a photovoltaic cell of claim 17, further comprising:

controlling the first magnitude of the first photon flux by the first amplitude of the first control signal; and controlling the second magnitude of the second photon flux by the second amplitude of the second control signal.

19. The process for determining a nonlinear response of a photovoltaic cell of claim 17, wherein at least one of the first light pulses comprises a calibrated value of first photon flux, and solving the system of linear equations comprises a scaled solution of the nonlinear relationship between the photovoltaic output and the magnitude of flux, based on the calibrated value of first photon flux.

20. The process for determining a nonlinear response of a photovoltaic cell of claim 17, wherein the first light emitter comprises a first light emitting diode comprising a first wavelength, the second light emitter comprises a second light emitting diode comprising a second wavelength, and the first wavelength is different from the second wavelength.

\* \* \* \* \*